(12) United States Patent
Chang et al.

(10) Patent No.: US 11,412,264 B2
(45) Date of Patent: Aug. 9, 2022

(54) PARAMETER SET SIGNALING FOR VIDEO CODING

(71) Applicant: QUALCOMM Incorporated, San Diego, CA (US)

(72) Inventors: Yao-Jen Chang, San Diego, CA (US); Muhammed Zeyd Coban, Carlsbad, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/029,550

(22) Filed: Sep. 23, 2020

(65) Prior Publication Data

US 2021/0092455 A1    Mar. 25, 2021

Related U.S. Application Data

(60) Provisional application No. 62/905,235, filed on Sep. 24, 2019.

(51) Int. Cl.
| | | |
|---|---|---|
| *H04N 19/70* | (2014.01) | |
| *H04N 19/96* | (2014.01) | |
| *H04N 19/119* | (2014.01) | |
| *H04N 19/136* | (2014.01) | |
| *H04N 19/172* | (2014.01) | |
| *H04N 19/174* | (2014.01) | |
| *H04N 19/176* | (2014.01) | |

(52) U.S. Cl.
CPC ........... *H04N 19/70* (2014.11); *H04N 19/119* (2014.11); *H04N 19/136* (2014.11); *H04N 19/172* (2014.11); *H04N 19/174* (2014.11); *H04N 19/176* (2014.11); *H04N 19/96* (2014.11)

(58) Field of Classification Search
None
See application file for complete search history.

(56) References Cited

U.S. PATENT DOCUMENTS

| | | | | |
|---|---|---|---|---|
| 10,511,852 B1* | 12/2019 | Xu | ........................ | H04N 19/513 |
| 11,284,077 B2* | 3/2022 | Hsu | ........................ | H04N 19/119 |
| 2017/0048552 A1* | 2/2017 | An | ........................ | H04N 19/96 |
| 2017/0272750 A1* | 9/2017 | An | ........................ | H04N 19/147 |
| 2018/0184109 A1* | 6/2018 | Lin | ........................ | H04N 19/44 |
| 2018/0288446 A1* | 10/2018 | An | ........................ | H04N 19/70 |
| 2019/0020895 A1* | 1/2019 | Liu | ........................ | H04N 19/176 |
| 2020/0053359 A1* | 2/2020 | Lee | ........................ | H04N 19/186 |
| 2020/0288150 A1* | 9/2020 | Jun | ........................ | H04N 19/119 |
| 2020/0366900 A1* | 11/2020 | Jun | ........................ | H04N 19/11 |

(Continued)

OTHER PUBLICATIONS

Bross B., et al., "Versatile Video Coding (Draft 10)", JVET-S2001-vA, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 550 Pages.

(Continued)

*Primary Examiner* — Mohammad J Rahman
(74) *Attorney, Agent, or Firm* — Shumaker & Sieffert, P.A.

(57) ABSTRACT

A video coder may code, in a picture parameter set (PPS), a syntax element indicative of a luma coding tree block size of coding tree units (CTUs) of a picture of video data to which the PPS is applicable. The video coder may further code the picture of the video data to which the PPS is applicable in accordance with the syntax element in the PPS.

26 Claims, 8 Drawing Sheets

(56) References Cited

U.S. PATENT DOCUMENTS

| | | | |
|---|---|---|---|
| 2020/0374513 A1* | 11/2020 | Xiu | H04N 19/583 |
| 2020/0404316 A1* | 12/2020 | Zhang | H04N 19/184 |
| 2021/0006790 A1* | 1/2021 | Zhang | H04N 19/50 |
| 2021/0044838 A1* | 2/2021 | Chen | H04N 19/70 |
| 2021/0076035 A1* | 3/2021 | Hsu | H04N 19/1883 |
| 2021/0136369 A1* | 5/2021 | Lim | H04N 19/96 |
| 2021/0168404 A1* | 6/2021 | Lim | H04N 19/513 |
| 2021/0274174 A1* | 9/2021 | Sjoberg | H04N 19/124 |
| 2021/0274223 A1* | 9/2021 | Lim | H04N 19/82 |

OTHER PUBLICATIONS

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

Chang Y-J., et al., "AHG12: On Tile and Brick Partition", JVET-O0452, Joint Video Experts Team (JVET) of ITU-T SG 16 WP 3 and ISO/IEC JTC 1/SC 29/WG 11, 15th Meeting, Gothenburg, SE, Jul. 3-12, 2019, pp. 1-4.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

ITU-T H.265, Series H: Audiovisual and Multimedia Systems, Infastructure of Audiovisual Services—Coding of Moving Video, High Efficiency Video Coding, The International Telecommunication Union, Jun. 2019, 696 Pages.

U.S. Appl. No. 62/895,419, filed Sep. 3, 2019.

International Search Report and Written Opinion—PCT/US2020/052473—ISA/EPO—dated Dec. 2, 2020 14 Pages.

Chang Y-J., et al., "AHG12: On Brick Signaling", JVET-P0433, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-9.

Hannuksela M.M., et al., "AHG12: On Tile and Brick Signalling (Combination of JVET-O0390 and JVET-O0511)", JVET-O1075, Joint Video Experts Team (JVET) of ITU-T SG 16 WP 3 and ISO/IEC JTC 1/SC 29/WG 11, 15th Meeting, Gothenburg, SE, Jul. 3-12, 2019, XP30220723A, 8 Pages.

* cited by examiner

PARAMETER SET SIGNALING FOR VIDEO CODING

This application claims the benefit of U.S. Provisional Application No. 62/905,235, filed Sep. 24, 2019, which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for signaling information for decoding video data at a picture parameter set (PPS) level in ways that reduces parsing dependencies between the PPS for a picture of video data and a sequence parameter set (SPS) for the picture of video data. The techniques may be applied to the Versatile Video Coding standard and other future video coding standards and may improve the performance of a video coder that parses the PPS and the SPS.

A PPS for a picture of video data may signal certain syntax elements for decoding the picture. Such syntax elements may include brick syntax elements that may be used for decoding bricks of the picture. The signaling of such brick syntax elements may depend on the values of various parameters in the PPS. However, the values of such parameters may be dependent upon the values of syntax elements that are included in the SPS for the picture.

For example, the values of various parameters in the PPS may be dependent upon the coding tree block size of coding tree units of the picture. If a syntax element that indicates the coding tree block size of coding tree units of the picture is only included in the SPS for the picture and not in the PPS for the picture, then the parsing of the PPS for the picture may be dependent on parsing the SPS for the picture.

To solve such parsing dependencies between the PPS for the picture and the SPS for the picture, the PPS may include a syntax element that indicates the coding tree block size of coding tree units of the picture, which may have the same value as the syntax element that indicates the coding tree block size of coding tree units of the picture in the SPS for the picture. In this way, a video coder may be able to determine the values of parameters in the PPS for the picture without depending on the syntax element in the SPS for the picture that indicates the coding tree block size of coding tree units of the picture, thereby reducing the parsing dependencies between the PPS and the SPS for the picture.

Reducing parsing dependencies between the PPS and the SPS for a picture of video data may improve the performance of coding the picture of video data, such as by enabling a video decoder to parse the PPS for a picture of video data before parsing the SPS for the picture of video data, or by enabling a video decoder to parse the PPS and SPS for a picture of video data substantially in parallel, thereby increasing the flexibility of a video decoder to parse the PPS and the SPS of a picture of video data and to decode the picture of video data.

In one example, a method for coding video data includes coding, in a picture parameter set (PPS), a syntax element indicative of a luma coding tree block size of coding tree units (CTUs) of a picture of video data to which the PPS is applicable. The method further includes coding the picture of the video data to which the PPS is applicable in accordance with the syntax element in the PPS.

In another example, a device for coding video data includes memory configured to store video data. The device further includes one or more processors implemented in circuitry and communicatively coupled to the memory, the one or more processors being configured to: code, in a picture parameter set (PPS), a syntax element indicative of a luma coding tree block size of coding tree units (CTUs) of a picture of video data to which the PPS is applicable; and code the picture of the video data to which the PPS is applicable in accordance with the syntax element in the PPS.

In another example, a device for video coding includes means for coding, in a picture parameter set (PPS), a syntax element indicative of a luma coding tree block size of coding tree units (CTUs) of a picture to which the PPS is applicable; and means for coding the picture of the video data to which the PPS is applicable in accordance with the syntax element in the PPS.

In another example, a non-transitory computer-readable storage medium is encoded with instructions that, when executed, cause one or more processor to: code, in a picture parameter set (PPS), a syntax element indicative of a luma coding tree block size of coding tree units (CTUs) of a picture of video data to which the PPS is applicable; and code the picture of the video data to which the PPS is applicable in accordance with the syntax element in the PPS.

The details of one or more examples are set forth in the accompanying drawings and the description below. Other features, objects, and advantages will be apparent from the description, drawings, and claims.

DETAILED DESCRIPTION

Figure 1:
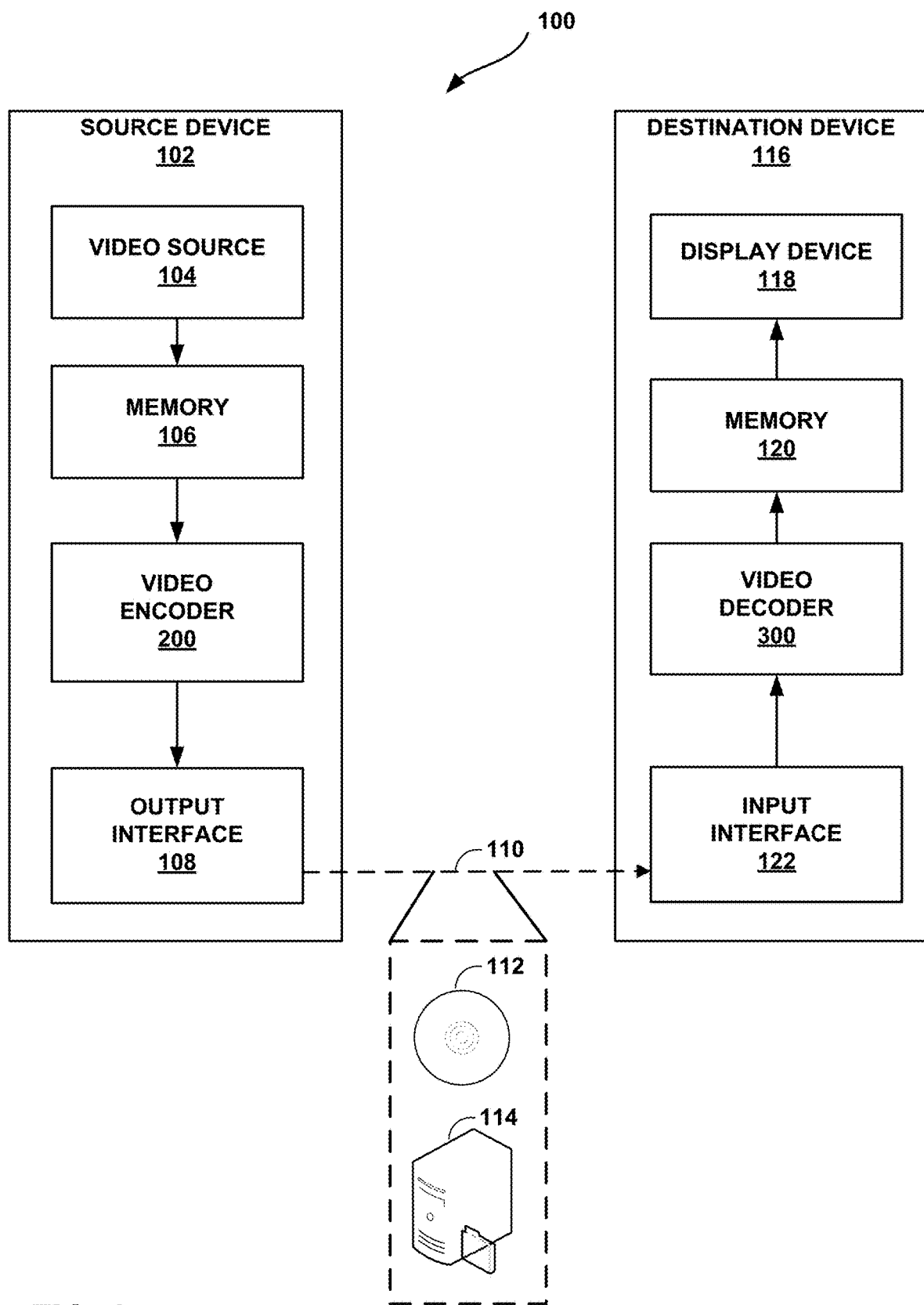
FIG. 1 is a block diagram illustrating an example video encoding and decoding system that may perform the techniques of this disclosure.

In general, this disclosure describes techniques for signaling information for decoding video data at a picture parameter set (PPS) level in ways that reduce dependencies between the PPS for a picture of video data and a sequence parameter set (SPS) for the picture of video data. A video encoder may, as part of encoding video data, generate parameter sets, such as PPSs and SPSs, to be used for decoding pictures of video data. A PPS may contain information, such as syntax elements, which applies to a single picture of the video data. An SPS may contain information, such as syntax elements, which applies to all pictures in a sequence of pictures of the video data, and which does not change from picture to picture within the sequence of pictures.

When coding a PPS that is applicable for a picture of video data, parsing dependencies may exist between a PPS that is applicable for the picture and a SPS that is applicable for the picture, such that the value of a parameter in the PPS may depend upon the values of one or more parameters in the SPS. For example, a PPS may include a conditional statement that is conditioned upon the value of a variable. If the value of the variable depends on the value of a parameter specified in the SPS, then a parsing dependency exists between the PPS and the SPS. When such parsing dependencies exist between a PPS for the picture and a SPS for the picture, a video coder (e.g., a video encoder or a video decoder) may not be able to determine the value of a parameter in the PPS until the video coder has determined the values of one or more parameters in the SPS upon which the value of the parameter in the PPS depends.

Such parsing dependencies may negatively impact the performance of a computer that parses the PPS and the SPS, such as by preventing a video decoder from parsing the PPS for a picture of video data before parsing the SPS for the picture of video data and/or parsing the PPS and the SPS substantially in parallel, thereby potentially increase the amount of processing cycles and/or time required to parse the PPS and the SPS for a picture of video data, and potentially reducing the performance of a video coder that parses the PPS and the SPS.

Aspects of the present disclosure include techniques for that reduce dependencies between the PPS for a picture of video data and a sequence parameter set (SPS) for the picture of video data. For example, if a value of a variable in the PPS depends on the value of a parameter specified in the SPS, a video encoder may encode, in the PPS, the value of the parameter upon which the value of the variable in the PPS depends. In another example, if the PPS includes a conditional statement that depends on the a value of a variable in the PPS, and if the value of the variable depends on the value of a parameter specified in the SPS, a video coder may refrain from encoding the conditional statement in the PPS, thereby removing the conditional statement from the PPS. These and other techniques are further described below.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for signaling parameters of a PPS in ways that reduce parsing dependencies with a SPS. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for signaling parameters of a PPS in ways that reduce parsing dependencies with a SPS. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18$^{th}$ Meeting: by teleconference, 22 Jun.-1 Jul. 2020, JVET-52001-vA (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

A bitstream may comprise network abstraction layer (NAL) units. A NAL unit is a syntax structure containing an indication of the type of data in the NAL unit and bytes containing that data in the form of a raw byte sequence payload (RB SP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RB SP includes zero bits.

As noted above, a bitstream may include a representation of encoded pictures of the video data and associated data. The associated data may include parameter sets. NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (e.g., video encoder 200 or video decoder 300) may code, in a PPS, a syntax element indicative of a luma coding tree block size of a picture of video data to which the PPS is applicable, and may code the picture of video data to which the PPS is applicable in accordance with the syntax element in the PPS.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
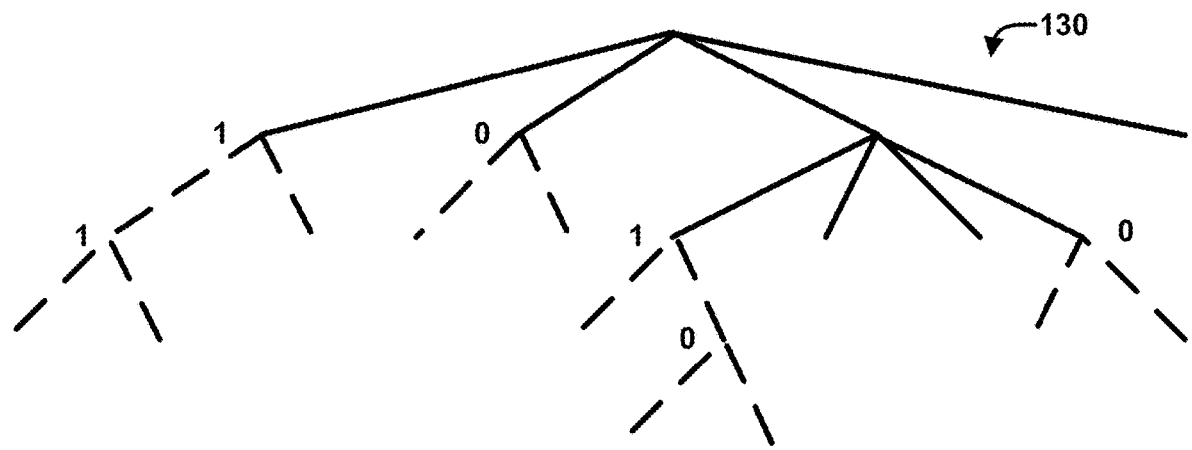
FIGS. 2A and 2B are conceptual diagrams illustrating an example quadtree binary tree (QTBT) structure, and a corresponding coding tree unit (CTU).
Figure 2B:
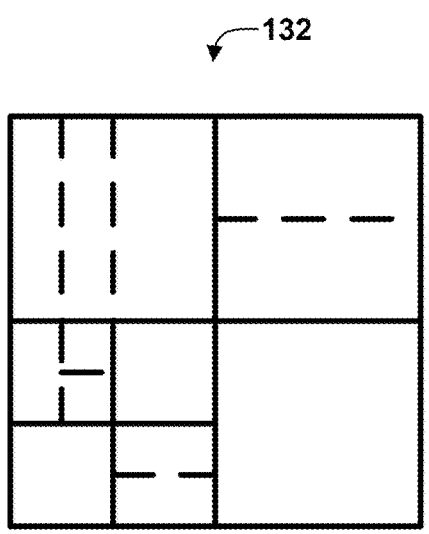

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

Signaling techniques reducing parsing dependencies between parameter sets are herein disclosed. The signaling techniques of this disclosure may be applied to the Versatile Video Coding (VVC) standard and the other future video coding standards.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC) or ITU-T H.265, including its range and screen content coding extensions, 3D video coding (3D-HEVC) and multiview extensions (MV-HEVC) and scalable extension (SHVC), has recently been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

In 2016, MPEG and ITU-T VCEG formed a Joint Exploration Video Team (JVET) to explore and develop new video coding tools for the next generation of video coding standard, VVC. Draft 6 of the VCC standard is described in Bross, et al., "Versatile Video Coding (Draft 6)," Joint Video Experts Team (WET) of ITU-T SG 16 WP 3 and ISO/IEC JTC 1/SC 29/WG 11, 15th Meeting: Gothenburg, SE, 3-12 Jul. 2019, JVET-O2001 (hereinafter "VCC Draft 6"). The reference software is called VVC Test Model (VTM). The sections of VVC Draft 6 that may be improved in this disclosure are shown in below in Table 1. Video encoder 200 may generate the parameters listed below and video decoder 300 may decode the parameters to determine how to decode corresponding video data.

TABLE 1

|  | Descriptor |
|---|---|
| pic_parameter_set_rbsp( ) { | |
| ... | |
|    pic_width_in_luma_samples | ue(v) |
|    pic_height_in_luma_samples | ue(v) |
| ... | |
|    single_tile_in_pic_flag | u(1) |
|    if( !single_tile_in_pic_flag ) { | |
|       uniform_tile_spacing_flag | u(1) |
|       if( uniform_tile_spacing_flag ) { | |
|          tile_cols_width_minus1 | ue(v) |
|          tile_rows_height_minus1 | ue(v) |
|       } else { | |
|          num_tile_columns_minus1 | ue(v) |
|          num_tile_rows_minus1 | ue(v) |
|          for( i = 0; i < num_tile_columns_minus1; i++ ) | |
|             tile_column_width_minus1[ i ] | ue(v) |
|          for( i = 0; i < num_tile_rows_minus1; i++ ) | |
|             tile_row_height_minus1[ i ] | ue(v) |
|       } | |
|       brick_splitting_present_flag | u(1) |
|       if( uniform_tile_spacing_flag && brick_splitting_present_flag ) | |
|          num_tiles_in_pic_minus1 | ue(v) |
|       for( i = 0; brick_splitting_present_flag && i <= num_tiles_in_pic_minus1 + 1; i++ ) { | |
|          if( RowHeight[ i ] > 1 ) | |
|             brick_split_flag[ i ] | u(1) |
|          if( brick_split_flag[ i ] ) { | |
|             if( RowHeight[ i ] > 2 ) | |
|                uniform_brick_spacing_flag[ i ] | u(1) |
|             if( uniform_brick_spacing_flag[ i ] ) | |
|                brick_height_minus1[ i ] | ue(v) |
|             else { | |
|                num_brick_rows_minus2[ i ] | ue(v) |
|                for( j = 0; j <= num_brick_rows_minus2[ i ]; j++ ) | |
|                   brick_row_height_minus1[ i ][ j ] | ue(v) |
|             } | |
|          } | |
|       } | |
|    } | |

As shown in Table 1, the PPS may iterate through tiles of a picture to signal syntax elements that signal information regarding bricks in the tiles of the picture. For example, the PPS may signal whether a tile is split into two or more bricks by including the brick syntax element brick_split_flag[i] that indicates whether the i-th tile is split into two or more bricks. Video decoder 300 may be able to infer the value of the brick syntax element brick_split_flag[i] for the i-th tile as well as other brick info for the i-th tile based at least in part on deriving the value of the parameter RowHeight[i], which indicates the row height of the i-th tile. If the row height of the i-th tile is not greater than 1, the video decoder 300 may infer the value of brick_split_flag[i] to be 0, thereby indicating that the i-th tile is not split into two or more bricks. If the row height of the i-th tile is greater than 1, the PPS may instead explicitly signal the brick syntax element brick_split_flag[i].

Further, if brick_split_flag[i] is equal to 1, the PPS may also signal horizontal brick boundaries of the two or more bricks are distributed uniformly across the tile by including the brick syntax element uniform_brick_spacing_flag[i] that indicates whether bricks in the i-th tile are distributed uniformly across the tile. Similarly, video decoder 300 may be able to infer the value of the brick syntax element uniform_brick_spacing_flag[i] for the i-th tile based at least in part on deriving the value of the parameter RowHeight[i]. If the row height of the i-th tile is not greater than 2, the video coder may refrain from signaling uniform_brick_spacing_flag[i] and may instead infer that uniform_brick_spacing_flag[i] is equal to 1. If the row height of the i-th tile is greater than 2, the PPS may instead explicitly signal the brick syntax element uniform_brick_spacing_flag[i].

As discussed above, parsing dependencies between a SPS and a PPS referenced by a picture of video data may cause a video coder (e.g., video encoder 200 or video decoder 300) to be unable to determine the values of certain parameters in a PPS until the video coder has parsed at least a portion of the SPS.

When decoding the PPS referenced by a picture of video data, video decoder 300 may use the number of tiles in the picture in order to iterate through tiles of the picture in order to decode various parameters for the tiles in the picture. Specifically, the PPS may include a conditional loop having a condition that is based at least in part on a number of tiles in the picture of video data. When decoding the PPS, the video decoder 300 may also determine the height of tile rows in the picture in units of CTB in order to determine whether the values of certain brick syntax elements are signaled in the PPS or whether video decoder 300 is to infer the values of such syntax elements.

As part of parsing the PPS, video decoder 300 may determine the values of the parameters NumTilesInPic and RowHeight[i], such as shown in the portion of PPS in Table 1, where the value of the parameter NumTilesInPic corresponds to the number of tiles in the picture and the value of the parameter RowHeight[i] corresponds to the height of the i-th tile row in units of CTB. Video decoder 300 may derive the values of the parameters NumTilesInPic and RowHeight[i] based at least in part on the width of the picture and the height of the picture. However, if the values of the width of the picture and the height of the picture are signaled in the SPS, such as via signaling syntax elements pic_width_in_luma_samples and pic_height_in_luma_samples in the SPS, but not in the PPS, then determining the values of the parameters NumTilesInPic and RowHeight[i] may be dependent upon parsing the SPS to determine the values of the syntax elements pic_width_in_luma_samples and pic_height_in_luma_sample.

In the example of Table 1, both the syntax element pic_width_in_luma_samples and the syntax element pic_height_in_luma_samples have been moved from SPS to PPS as part of Reference Picture Resampling (RPR) adoption. Therefore, the values of the parameters NumTilesInPic and the parameter RowHeight[i] in the PPS are not dependent upon values of syntax elements pic_width_in_luma_samples and pic_height_in_luma_samples in the SPS.

However, determining the values of the parameters NumTilesInPic and RowHeight[i] may still be dependent on SPS signaling. Specifically, in addition to the values of the syntax element pic_width_in_luma_samples and the syntax element pic_height_in_luma_samples, the values of the parameters NumTilesInPic and RowHeight[i] may also depend upon a syntax element log 2_ctu_size_minus5 indicative of the coding tree block that is signaled by the SPS but is not signaled by the PPS.

As such, because it may not be possible to derive the value of RowHeight[i] at the PPS level due to parsing dependency issues with the SPS, aspects of this disclosure describe techniques for signaling syntax elements in the PPS in ways that resolve such parsing dependencies for deriving the value of the parameter RowHeight[i].

In the example of Table 1 above, the portion of the PSS in the example of Table 1 includes a syntax element num_tiles_in_pic_minus1 indicative of the number of tiles in the picture that references the PPS. As such, video decoder 300 may be able to decode the syntax element num_tiles_in_pic_minus1 in the PPS in order to determine the value of NumTilesInPic that corresponds to the number of tiles in the picture.

However, while signaling the syntax element num_tiles_in_pic_minus1 in the PPS may resolve a parsing dependency of the PPS on the SPS for deriving the value of NumTilesInPic, signaling the syntax element num_tiles_in_pic_minus1 in the PPS does not resolve the parsing dependency on SPS for determining the value of the parameter RowHeight[i]. Further, including a syntax element, such as num_tiles_in_pic_minus1, that indicates the number of tiles in the picture may increase the size of the PPS, in the worst case, by 33 bits, such as in the case of 8K content, e.g. 8192×4320 and CtbSize=32. Therefore, not including that indicates the number of tiles in the picture may potentially decrease the size of the PPS by up to 33 bits.

However, if the PPS does not include a syntax element that indicates the number of tiles in the picture, such as the syntax element num_tiles_in_pic_minus1, video decoder 300 may not be able to determine the number of tiles in the picture based on the information included in the PPS, such an omission may reintroduce the parsing dependency between the PPS and the SPS, in that the video coder may not be able to infer the number of tiles in the picture until the video coder parses the syntax element in the SPS that indicates the size of the coding tree block.

In another example, as part of parsing the PPS referenced by a picture of video data, video decoder 300 may parse conditional statements in order to determine whether to decode brick syntax elements indicative of information regarding bricks in the picture or to infer such information regarding bricks in the picture. For example, the PSS may, for an i-th tile in the picture, signal a syntax element brick_split_flag[i] indicative of whether the tile is divided into two or more bricks only if the value of a parameter RowHeight[i] that indicates the height of the i-th tile row in units of CTB is greater than one. If the value of RowHeight [i] is greater than one, video decoder 300 may be able to decode the syntax element brick_split_flag[i] to determine whether the tile is divided into two or more bricks. On the other hand, if the value of RowHeight[i] is not greater than one, video decoder 300 may instead infer that the tile is not divided into two or more bricks based on the value of RowHeight[i] not being greater than one.

Similarly, the PSS may, for an i-th tile in the picture, where the tile is divided into two or more bricks, signal a syntax element uniform_brick_spacing_flag[i] indicative of whether the horizontal brick boundaries of the two or more bricks are distributed uniformly across the tile only if the value of a parameter RowHeight[i] that indicates the height of the i-th tile row in units of CTB is greater than two. If the value of RowHeight[i] is greater than two, video decoder 300 may be able to decode the syntax element uniform_brick_spacing_flag[i] to determine whether the horizontal brick boundaries of the two or more bricks in the tile are distributed uniformly across the tile. On the other hand, if the value of RowHeight[i] is not greater than two, video decoder 300 may instead infer that the horizontal brick boundaries of the two or more bricks in the tile are distributed uniformly across the tile based on the value of RowHeight[i] not being greater than two.

As discussed above, determining the height of a tile row for a picture of video data may introduce parsing dependencies between a PPS and a SPS that both apply to a picture of video data and a SPS. Specifically, the value of the parameter RowHeight[i], which is the height of the tile row in units of CTB for the i-th tile in the picture may depend on information in the SPS. That is, when parsing the PPS, video decoder 300 may not be able to determine the value of the parameter RowHeight[i] solely from information decoded from the PPS, but instead may require information decoded from the SPS to determine the value of the parameter RowHeight[i]. As such, when parsing the PPS, video decoder 300 may not be able to determine the value of RowHeight[i] for the i-th tile of the picture and to evaluate a conditional statement that is dependent on the value of RowHeight[i] independently from parsing the SPS.

Video decoder 300 may be able to derive both the number of tiles in a picture and the height of a tile row in units of CTB for tiles of the picture based at least in part on the coding tree block size of the picture. As such, if the PPS includes an indication of the coding tree block size for the picture, video decoder 300 may be able to derive both the number of tiles in the picture and the height of a tile row in units of CTB (e.g., RowHeight[i]) for tiles of the picture without parsing dependencies with SPS and without requiring the PPS to explicitly signal a syntax element indicative of the number of tiles in the picture. Because signaling the coding tree block size for the picture may require as little as 2 additional bits, as opposed to the up to 33 bits that may be required to signal the number of tiles in the picture, include a syntax element that indicates the coding tree block size for the picture in the PPS may reduce the size of the PPS.

In accordance with aspects of the present disclosure, the signaling of the syntax element num_tiles_in_pic_minus1 is removed from PPS, while information regarding coding tree block size (CtbSize) is signaled in PPS. In particular, pps_log_2_ctu_size_minus5 as well as pic_width_in_luma_samples and pic_height_in_luma_samples may be required in PPS to derive the values of PicWidthInCtbsY and PicHeightInCtbsY, which can infer the values of NumTilesInPic and RowHeight[i]. Further, the signaling of pps_log_2_ctu_size_minus5 may require 2 additional bits, but removing the syntax element of num_tiles_in_pic_minus1 may reduce as many as 33 bits in the worst case of 8K content, e.g. 8192×4320 and coding tree block size (CtbSize)=32.

That is, in accordance with aspects of the present disclosure, to reduce the parsing dependency between a PPS and a SPS, instead of including, in a PPS referenced by a picture of video data, a syntax element that indicates the number of tiles in the picture, the PPS referenced by a picture may instead include a syntax element that indicates the coding tree block size for the picture. Video decoder 300 may decode the syntax element to determine the value of the coding tree block size for the picture and may derive both the number of tiles in the picture and the height of a tile row in units of CTB (e.g., RowHeight[i]) for tiles of the picture based on the value of the coding tree block size for the picture.

The PPS for a picture may include a syntax element that indicates the number of tiles in the picture may be a syntax element pps_log_2_ctu_size_minus5, that specifies the luma coding tree block size of each CTU in the picture minus 5. In particular, the syntax element pps_log_2_ctu_size_minus5 may have the same value as the syntax element log 2_ctu_size_minus5 in the SPS for the picture. Video encoder may therefore determine the coding tree block size (CtbSize) from the syntax element pps_log_2_ctu_size_minus5 by adding 5 to the value of the syntax element pps_log_2_ctu_size_minus5 and by left-shifting 1 by the resulting sum, such that CtbSize=1<<(pps_log_2_ctu_size_minus5+5). By signaling, in the PPS for the picture, the syntax element pps_log_2_ctu_size_minus5 having the same value as the syntax element log 2_ctu_size_minus5 in the SPS for the picture, the present disclosure removes the parsing dependency between the PPS and the SPS for determining the value of the parameters NumTilesInPic and RowHeight[i] because the values of these parameters may be derived from the syntax element pps_log_2_ctu_size_minus5 in the PPS instead of the syntax element log 2_ctu_size_minus5 in the SPS.

The syntax changes to VVC Draft 6 version 14 are described in Table 2, where content between <DELETE></DELETE> are deleted from the syntax while content between <ADD></ADD> are added to the syntax.

TABLE 2

| Section 7.3.2.4 in VVC Draft 6 version 14: | |
|---|---|
| | Descriptor |
| pic_parameter_set_rbsp( ) { | |
| ... | |
|     pic_width_in_luma_samples | ue(v) |
|     pic_height_in_luma_samples | ue(v) |
|     <ADD> pps_log2_ctu_size_minus5 </ADD> | u(2) |
| ... | |
|     single_tile_in_pic_flag | u(1) |
|     if( !single_tile_in_pic_flag ) { | |
|         uniform_tile_spacing_flag | u(1) |
|         if( uniform_tile_spacing_flag ) { | |
|             tile_cols_width_minus1 | ue(v) |
|             tile_rows_height_minus1 | ue(v) |
|         } else { | |
|             num_tile_columns_minus1 | ue(v) |
|             num_tile_rows_minus1 | ue(v) |
|             for( i = 0; i < num_tile_columns_minus1; i++ ) | |
|                 tile_column_width_minus1[ i ] | ue(v) |
|             for( i = 0; i < num_tile_rows_minus1; i++ ) | |
|                 tile_row_height_minus1[ i ] | ue(v) |
|         } | |
|         brick_splitting_present_flag | u(1) |
| <DELETE>if( uniform_tile_spacing_flag && brick_splitting_present_flag )</DELETE> | |
| <DELETE>num_tiles_in_pic_minus1</DELETE> | |
|         for( i = 0; brick_splitting_present_flag && i < <DELETE>= num_tiles_in_pic_minus1 + 1</DELETE> <ADD>NumTilesInPic</ADD> ; i++ ) { | |
|             if( RowHeight[ i ] > 1 ) | |
|                 brick_split_flag[ i ] | u(1) |
|             if( brick_split_flag[ i ] ) { | |
|                 if( RowHeight[ i ] > 2 ) | |
|                     uniform_brick_spacing_flag[ i ] | u(1) |
|                 if( uniform_brick_spacing_flag[ i ] ) | |
|                     brick_height_minus1[ i ] | ue(v) |
|                 else { | |
|                     num_brick_rows_minus2[ i ] | ue(v) |
|                     for( j = 0; j <= num_brick_rows_minus2[ i ]; j++ ) | |
|                         brick_row_height_minus1[ i ][ j ] | ue(v) |
|                 } | |
|             } | |
|         } | |
|     } | |
| } | |

Section 7.4.3.4 in VVC Draft 6 version 14:
pic_width_in_luma_samples specifies the width of each decoded picture referring to the PPS in units of luma samples. pic_width_in_luma_samples shall not TABLE 2-continued Section 7.3.2.4 in VVC Draft 6 version 14:

Descriptor be equal to 0, shall be an integer multiple of Max(8, MinCbSizeY), and shall be less
than or equal to pic_width_max_in_luma_samples.
When subpics_present_flag is equal to 1, the value of
pic_width_in_luma_samples shall be equal to pic_width_max_in_luma_samples.
pic_height_in_luma_samples specifies the height of each decoded picture
referring to the PPS in units of luma samples. pic_height_in_luma_samples shall not
be equal to 0 and shall be an integer multiple of Max(8, MinCbSizeY), and shall be
less than or equal to pic_height_max_in_luma_samples.
When subpics_present_flag is equal to 1, the value of
pic_height_in_luma_samples shall be equal to pic_height_max_in_luma_samples.
<ADD>pps_log2_ctu_size_minus5 plus 5 specifies the luma coding tree
block size of each CTU in each picture referring to the PPS. The value of
pps_log2_ctu_size_minus5 shall be equal to log2_ctu_size_minus5.
CtbSize = 1 << (pps_log2_ctu_size_minus5 + 5)</ADD>
single_tile_in_pic_flag equal to 1 specifies that there is only one tile in each
picture referring to the PPS. single_tile_in_pic_flag equal to 0 specifies that there is
more than one tile in each picture referring to the PPS.
NOTE -
In absence of further brick splitting within a tile, the whole tile is referred
to as a brick. When a picture contains only a single tile without further brick
splitting, it is referred to as a single brick.
It is a requirement of bitstream conformance that the value of
single_tile_in_pic_flag shall be the same for all PPSs that are referred to by coded
pictures within a CVS.
uniform_tile_spacing_flag equal to 1 specifies that tile column boundaries
and likewise tile row boundaries are distributed uniformly across the picture and
signalled using the syntax elements tile_cols_width_minus1 and
tile_rows_height_minus1. uniform_tile_spacing_flag equal to 0 specifies that tile
column boundaries and likewise tile row boundaries may or may not be distributed
uniformly across the picture and signalled using the syntax elements
num_tile_columns_minus1 and num_tile_rows_minus1 and a list of syntax element
pairs tile_column_width_minus1[i] and tile_row_height_minus1[i]. When not
present, the value of uniform_tile_spacing_flag is inferred to be equal to 1.
tile_cols_width_minus1 plus 1 specifies the width of the tile columns
excluding the right-most tile column of the picture in units of CTBs when
uniform_tile_spacing_flag is equal to 1. The value of tile_cols_width_minus1 shall be
in the range of 0 to PicWidthInCtbsY − 1, inclusive. When not present, the value of
tile_cols_width_minus1 is inferred to be equal to PicWidthInCtbsY − 1.
tile_rows_height_minus1 plus 1 specifies the height of the tile rows
excluding the bottom tile row of the picture in units of CTBs when
uniform_tile_spacing_flag is equal to 1. The value of tile_rows_height_minus1 shall
be in the range of 0 to PicHeightInCtbsY − 1, inclusive. When not present, the value
of tile_rows_height_minus1 is inferred to be equal to PicHeightInCtbsY − 1.
num_tile_columns_minus1 plus 1 specifies the number of tile columns
partitioning the picture when uniform_tile_spacing_flag is equal to 0. The value of
num_tile_columns_minus1 shall be in the range of 0 to PicWidthInCtbsY − 1,
inclusive. If single_tile_in_pic_flag is equal to 1, the value of
num_tile_columns_minus1 is inferred to be equal to 0. Otherwise, when
uniform tile_spacing_flag is equal to 1, the value of num_tile_columns_minus1 is
inferred as specified in clause 6.5.1.
num_tile_rows_minus1 plus 1 specifies the number of tile rows partitioning
the picture when uniform_tile_spacing_flag is equal to 0. The value of
num_tile_rows_minus1 shall be in the range of 0 to PicHeightInCtbsY − 1, inclusive.
If single_tile_in_pic_flag is equal to 1, the value of num_tile_rows_minus1 is inferred
to be equal to 0. Otherwise, when uniform_tile_spacing_flag is equal to 1, the value
of num_tile_rows_minus1 is inferred as specified in clause 6.5.1.
The variable NumTilesInPic is set equal to
(num_tile_columns_minus1 + 1) * (num_tile_rows_minus1 + 1).
When single_tile_in_pic_flag is equal to 0, NumTilesInPic shall be greater
than 1.
tile_column_width_minus1[i] plus 1 specifies the width of the i-th tile
column in units of CTBs.
tile_row_height_minus1[i] plus 1 specifies the height of the i-th tile
row in units of CTBs.
brick_splitting_present_flag equal to 1 specifies that one or more tiles of
pictures referring to the PPS may be divided into two or more bricks.
brick_splitting_present_flag equal to 0 specifies that no tiles of pictures referring to
the PPS are divided into two or more bricks.
<DELETE>num_tiles_in_pic_minus1 plus 1 specifies the number of tiles in
each picture referring to the PPS. The value of num_tiles_in_pic_minus1 shall be
equal to NumTilesInPic − 1. When not present, the value of num_tiles_in_pic_minus1
is inferred to be equal to NumTilesInPic − 1.</DELETE>
brick_split_flag[i] equal to 1 specifies that the i-th tile is divided into two or
more bricks. brick_split_flag[i] equal to 0 specifies that the i-th tile is not divided
into two or more bricks. When not present, the value of brick_split_flag[i] is inferred
to be equal to 0.

TABLE 2-continued

Section 7.3.2.4 in VVC Draft 6 version 14:

Descriptor uniform_brick_spacing_flag[i] equal to 1 specifies that horizontal brick
boundaries are distributed uniformly across the i-th tile and signalled using the syntax
element brick_height_minus[i]. uniform_brick_spacing_flag[i] equal to 0
specifies that horizontal brick boundaries may or may not be distributed uniformly
across i-th tile and signalled using the syntax element num_brick_rows_minus2[i]
and a list of syntax elements brick_row_height_minus1[i][j]. When not present, the
value of uniform_brick_spacing_flag[i] is inferred to be equal to 1.
brick_height_minus1[i] plus 1 specifies the height of the brick rows
excluding the bottom brick in the i-th tile in units of CTBs when
uniform_brick_spacing_flag[i] is equal to 1. When present, the value of
brick_height_minus1 shall be in the range of 0 to RowHeight[i] − 2, inclusive.
When not present, the value of brick_height_minus1[i] is inferred to be equal to
RowHeight[i] − 1.
num_brick_rows_minus2[i] plus 2 specifies the number of bricks
partitioning the i-th tile when uniform_brick_spacing_flag[i] is equal to 0. When
present, the value of num_brick_rows_minus2[i] shall be in the range of 0 to
RowHeight[i] − 2, inclusive. If brick_split_flag[i] is equal to 0, the value of
num_brick_rows_minus2[i] is inferred to be equal to −1. Otherwise, when
uniform_brick_spacing_flag[i] is equal to 1, the value of
num_brick_rows_minus2[i] is inferred as specified in 6.5.1.
brick_row_height_minus1[i][j] plus 1 specifies the height of the j-th brick
in the i-th tile in units of CTBs when uniform_tile_spacing_flag is equal to 0.

As can be seen in Table 2, a video coder (e.g., video encoder 200 or video decoder 300) may code, in the PPS, a syntax element pps_log_2_ctu_size_minus5 indicative of a luma coding tree block size of a picture of video data to which the PPS is applicable, where the syntax element pps_log_2_ctu_size_minus5 has the same value as the syntax element log_2_ctu_size_minus5 in the SPS. That is, viden encoder 200 may encode the syntax element pps_log_2_ctu_size_minus5 in the PPS and video decoder 300 may decode the syntax element pps_log_2_ctu_size_minus5.

Video decoder 300 may determine the luma coding tree block size of the picture based on the syntax element pps_log_2_ctu_size_minus5 in the PPS. Because the syntax element pps_log_2_ctu_size_minus5 indicates the $\log_2$ luma coding tree block size of the CTUs in the picture minus 5, video decoder 300 may determine the luma coding tree block size CtbSize of the CTUs in the picture by adding 5 to the value of the syntax element pps_log_2_ctu_size_minus5 and by left-shifting 1 by the resulting sum, such as CtbSize= 1<<(pps_log_2_ctu_size_minus5+5).

The video coder may also code, in the PPS, a conditional loop having a condition that is based at least in part on the number of tiles in the picture of video data. For example, video encoder 200 may encode, in the PPS, the conditional loop for (i=0; brick splitting present flag && i<=NumTilesInPic+1; i++) that is based at least in part on the variable NumTilesInPic that corresponds to the number of tiles in the picture of video data, and video decoder 300 may decode the conditional loop in the PPS.

When video decoder 300 decodes, in the PPS, the conditional loop having a condition that is based at least in part on the variable NumTilesInPic that corresponds to the number of tiles in the picture of video data, video decoder 300 may determine the value of the variable NumTilesInPic in order to evaluate the condition i NumTilesInPic+1. As discussed above, video decoder 300 may determine the value of the variable NumTilesInPic based at least in part on the picture width in luma samples, as indicated by the syntax element pic_width_in_luma_samples, the picture height in luma samples, as indicated by the syntax element pic_height_in_luma_samples, and the luma coding tree block size CtbSize of the CTUs in the picture, as derived from the syntax element pps_log_2_ctu_size_minus5. Video encoder 200 may therefore, upon determining the value of the variable NulTilesInPic, iterate the conditional loop based at least in part on the value of the variable NulTiles.

As described above, because video decoder 300 may be able to determine the number of tiles in the picture of video data without the PPS including a syntax element that indicates the number of tiles in the picture, the video coder may therefore refrain from coding, in the PPS, a syntax element indicative of the number of tiles in the picture. That is, video encoder 200 may refrain from encoding, in the PPS, a syntax element indicative of the number of tiles in the picture, and video decoder 200 may refrain from decoding any syntax elements in the PPS that are indicative of the number of tiles in the picture.

As shown in Table 2, the video coder may also code, in the PPS, a conditional statement having a condition that is based at least in part on a height of a tile row of the picture to which the PPS is applicable. For example, video encoder 200 may encode, in the PPS, the conditional statements if(RowHeight[i]>1) and if(RowHeight[i]>2) that are based at least in part on the variable RowHeight[i] that corresponds to the a height of an i-th tile row of the picture of video data in units of CTB, and video decoder 300 may decode the conditional statements in the PPS.

When video decoder 300 decodes, in the PPS, a conditional statement, such as if(RowHeight[i]>1) and if(RowHeight[i]>2), that are based at least in part on the variable RowHeight[i] that corresponds to the a height of an i-th tile row of the picture of video data in units of CTB, video decoder 300 may determine the value of the variable RowHeight[i] in order to evaluate the condition RowHeight [i]>1 and/or RowHeight[i]>2. As discussed above, video decoder 300 may determine the value of the variable RowHeight[i] based at least in part on the luma coding tree block size CtbSize of the CTUs in the picture, as derived from the syntax element pps_log_2_ctu_size_minus5. Video decoder 300 may therefore, upon determining the value of the variable RowHeight[i], evaluate the conditional statement, such as by evaluating if(RowHeight[i]>1) and/or if(RowHeight[i]>2).

When video decoder 300 decodes the conditional statement if(RowHeight[i]>1) by determining the value of the variable RowHeight[i] that corresponds to the a height of an i-th tile row of the picture of video data in units of CTB, video decoder 300 may evaluate the conditional statement if(RowHeight[i]>1) to determine whether the PPS signals a syntax element brick_split_flag[i] indicative of whether an i-th tile of the picture of video data is divided into two or more bricks. If video decoder 300, when evaluating the conditional statement if(RowHeight[i]>1), determines that the conditional statement evaluates to true (i.e., the value of the variable RowHeight[i] is greater than 1), video decoder 300 may decode, in PPS a syntax element brick_split_flag[i] indicative of whether an i-th tile of the picture of video data is divided into two or more bricks. However, if video decoder 300, when evaluating the conditional statement if(RowHeight[i]>1), determines that the conditional statement evaluates to false (i.e., the value of the variable RowHeight[i] is not greater than 1), video decoder 300 may instead infer that an i-th tile of the picture of video data is not divided into two or more bricks.

Similarly, when video decoder 300 decodes the conditional statement if(RowHeight[i]>2) by determining the value of the variable RowHeight[i] that corresponds to the a height of an i-th tile row of the picture of video data in units of CTB, video decoder 300 may evaluate the conditional statement if(RowHeight[i]>2) to determine whether the PPS signals a syntax element uniform_brick_spacing_flag[i] indicative of whether one or more horizontal brick boundaries are uniformly distributed across an i-th tile of the picture of video data is divided into two or more bricks. If video decoder 300, when evaluating the conditional statement if(RowHeight[i]>2), determines that the conditional statement evaluates to true (i.e., the value of the variable RowHeight[i] is greater than 2), video decoder 300 may decode, in PPS a syntax element uniform_brick_spacing_flag[i] indicative of whether one or more horizontal brick boundaries are uniformly distributed across an i-th tile of the picture of video data is divided into two or more bricks. However, if video decoder 300, when evaluating the conditional statement if(RowHeight[i]>2), determines that the conditional statement evaluates to false (i.e., the value of the variable RowHeight[i] is not greater than 2), video decoder 300 may instead infer that one or more horizontal brick boundaries are uniformly distributed across an i-th tile of the picture of video data is divided into two or more bricks.

As such, the video coder may code the picture of video data to which the PPS is applicable in accordance with the syntax element pps_log_2_ctu_size_minus5. That is, video encoder 200 may encode the picture of video data to which the PPS is applicable in accordance with the syntax element pps_log_2_ctu_size_minus5, such as by encoding the syntax element pps_log_2_ctu_size_minus5 in the PPS, and video decoder 300 may decode the picture of video data to which the PPS is applicable in accordance with the syntax element pps_log_2_ctu_size_minus5, such as by decoding the syntax element pps_log_2_ctu_size_minus5 in the PPS.

In accordance with some aspects of the present disclosure, instead of or in addition to coding, in the syntax element pps_log_2_ctu_size_minus5 to reduce parsing dependencies between a PPS and a SPS, aspects of the present disclosure include additional techniques for reducing parsing dependencies between a PPS and a SPS.

As discussed above, PPS parsing dependency on SPS may be introduced by adding the syntax condition checks of RowHeight[i], such as the conditional statements if(Row Height[i]>1) and if(Row Height[i]>2), respectively, to brick_split_flag[i] and uniform_brick_spacing_flag[i]. Since HLS experts agreed to remove the dependencies on SPS in the PPS syntax, the issue should be addressed in the next version of VVC text. There are several proposed changes to address the issue:

Solution 1: The above dependency can be resolved by simply replacing the condition checks], such as the conditional statements if(Row Height[i]>1) and if(Row Height[i]>2), respectively, in the syntax with the conformance in the semantics. The proposed syntax changes to VVC Draft 6 version 14 are described in Table 3 below, where content between <DELETE></DELETE> are deleted from the syntax while content between <ADD></ADD> are added to the syntax.

TABLE 3

| Section 7.3.2.4 in VVC Draft 6 version 14: | Descriptor |
|---|---|
| pic_parameter_set_rbsp( ) { | |
| ... | |
|     brick_splitting_present_flag | u(1) |
|     if( uniform_tile_spacing_flag && brick_splitting_present_flag ) | |
|         num_tiles_in_pic_minus1 | ue(v) |
|     for( i = 0; brick_splitting_present_flag && i <= num_tiles_in_pic_minus1 + 1; i++ ) { | |
|         <DELETE>if( RowHeight[ i ] > 1 )</DELETE> | |
|         brick_split_flag[ i ] | u(1) |
|         if( brick_split_flag[ i ] ) { | |
|             <DELETE>if( RowHeight[ i ] > 2 )</DELETE> | |
|             uniform_brick_spacing_flag[ i ] | u(1) |
|             if( uniform_brick_spacing_flag[ i ] ) | |
|                 brick_height_minus1[ i ] | ue(v) |
|             else { | |

TABLE 3-continued

Section 7.3.2.4 in VVC Draft 6 version 14:

|  | Descriptor |
|---|---|
| num_brick_rows_minus2[ i ]<br>for( j = 0; j <= num_brick_rows_minus2[ i ]; j++ ) | ue(v) |
| brick_row_height_minus1[ i ][ j ]<br>}<br>}<br>} | ue(v) |

...
Section 7.4.3.4 in VVC Draft 6 version 14:
brick_splitting_present_flag equal to 1 specifies that one or more tiles of
pictures referring to the PPS may be divided into two or more bricks.
brick_splitting_present_flag equal to 0 specifies that no tiles of pictures referring to
the PPS are divided into two or more bricks.
num_tiles_in_pic_minus1 plus 1 specifies the number of tiles in each picture
referring to the PPS. The value of num_tiles_in_pic_minus1 shall be equal to
NumTilesInPic − 1. When not present, the value of num_tiles_in_pic_minus1 is
inferred to be equal to NumTilesInPic − 1.
brick_split_flag[i] equal to 1 specifies that the i-th tile is divided into two or
more bricks. brick_split_flag[i] equal to 0 specifies that the i-th tile is not divided
into two or more bricks. <DELETE>When not present, the value of
brick_split_flag[i] is inferred to be equal to 0.</DELETE> <ADD>It is a
requirement of bitstream conformance that the value of brick_split_flag[i] shall be
zero if RowHeight[i] = 1. </ADD>
uniform_brick_spacing_flag[i] equal to 1 specifies that horizontal brick
boundaries are distributed uniformly across the i-th tile and signalled using the syntax
element brick_height_minus1[i]. uniform_brick_spacing_flag[i] equal to 0
specifies that horizontal brick boundaries may or may not be distributed uniformly
across i-th tile and signalled using the syntax element num_brick_rows_minus2[i]
and a list of syntax elements brick_row_height_minus1[i][j]. When not present, the
value of uniform_brick_spacing_flag[i] is inferred to be equal to 1. <ADD>It is a
requirement of bitstream conformance that the value of uniform_brick_spacing_flag[i]
shall be one if RowHeight[i] = 2.</ADD>
brick_height_minus1[i] plus 1 specifies the height of the brick rows
excluding the bottom brick in the i-th tile in units of CTBs when
uniform_brick_spacing_flag[i] is equal to 1. When present, the value of
brick_height_minus1 shall be in the range of 0 to RowHeight[i] − 2, inclusive.
When not present, the value of brick_height_minus1[i] is inferred to be equal to
RowHeight[i] − 1.
num_brick_rows_minus2[i] plus 2 specifies the number of bricks
partitioning the i-th tile when uniform_brick_spacing_flag[i] is equal to 0. When
present, the value of num_brick_rows_minus2[i] shall be in the range of 0 to
RowHeight[i] − 2, inclusive. If brick_split_flag[i] is equal to 0, the value of
num_brick_rows_minus2[i] is inferred to be equal to −1. Otherwise, when
uniform_brick_spacing_flag[i] is equal to 1, the value of
num_brick_rows_minus2[i] is inferred as specified in 6.5.1.
brick_row_height_minus1[i][j] plus 1 specifies the height of the j-th brick
in the i-th tile in units of CTBs when uniform_tile_spacing_flag is equal to 0.

As shown in Table 3, a video coder may eliminate parsing dependencies between a PPS and a SPS caused by deriving the value of the variable RowHeight[i] by eliminating, from the PPS, conditional statements having RowHeight[i] as a condition, such as conditional statements if(Row Height[i]>1) and if(Row Height[i]>2). As such, the portion of the PPS in Table 3 does not include the variable RowHeight[i] or conditional statements having RowHeight [i] as a condition. Thus, video encoder 200 may refrain from encoding conditional statements having RowHeight[i] as a condition in the PPS, and video decoder 300 may refrain from decoding conditional statements having RowHeight[i] as a condition in the PPS.

Solution 2: The parsing dependency between a PPS and a SPS caused by RowHeight[i] can also be resolved by adding a new syntax element to specify the value of RowHeight[i] in the i-th tile. In particular, the PPS may include a syntax element row_height_minus1 that indicates the height of the i-th tile row of the picture of video data minus 1. Further the conditional statements in the PPS having RowHeight[i] as a condition, such as conditional statements if(Row Height[i]>1) and if(Row Height[i]>2), are replaced with conditional statements having the syntax element row_height_minus1 [i] as a condition, such as conditional statements if(row_height_minus1 [i]>0 and if(row_height_minus1 [i]>1).

The proposed syntax changes to VVC Draft 6 version 14 are described in Table 4 below, where content between <DELETE></DELETE> are deleted from the syntax while content between <ADD></ADD> are added to the syntax.

TABLE 4

Section 7.3.2.4 in VVC Draft 6 version 14:

| | Descriptor |
|---|---|
| pic_parameter_set_rbsp( ) { | |
| ... | |
|     brick_splitting_present_flag | u(1) |
|     if( uniform_tile_spacing_flag && brick_splitting_present_flag ) | |
|         num_tiles_in_pic_minus1 | ue(v) |
|     for( i = 0; brick_splitting_present_flag && i <= num_tiles_in_pic_minus1 + 1; i++ ) { | |
|         <ADD>row_height_minus1[ i ]</ADD> | ue(v) |
|         <DELETE>if( RowHeight[ i ] > 1 )</DELETE> | |
|         <ADD>if( row_height_minus1[ i ] > 0 )</ADD> | |
|             brick_split_flag[ i ] | u(1) |
|         if( brick_split_flag[ i ] ) { | |
|             <DELETE>if( RowHeight[ i ] > 2 )</DELETE> | |
|             <ADD>if( row_height_minus1[ i ] > 1 )</ADD> | |
|                 uniform_brick_spacing_flag[ i ] | u(1) |
|             if( uniform_brick_spacing_flag[ i ] ) | |
|                 brick_height_minus1[ i ] | ue(v) |
|             else { | |
|                 num_brick_rows_minus2[ i ] | ue(v) |
|                 for( j = 0; j <= num_brick_rows_minus2[ i ]; j++ ) | |
|                     brick_row_height_minus1[ i ][ j ] | ue(v) |
|             } | |
|         } | |
|     } | |
| ... | |

Section 7.4.3.4 in VVC Draft 6 version 14:
brick_splitting_present_flag equal to 1 specifies that one or more tiles of
pictures referring to the PPS may be divided into two or more bricks.
brick_splitting_present_flag equal to 0 specifies that no tiles of pictures referring to
the PPS are divided into two or more bricks.
num_tiles_in_pic_minus1 plus 1 specifies the number of tiles in each picture
referring to the PPS. The value of num_tiles_in_pic_minus1 shall be equal to
NumTilesInPic − 1. When not present, the value of num_tiles_in_pic_minus1 is
inferred to be equal to NumTilesInPic − 1.
<ADD>row_height_minus1[i] plus 1 specifies the height of the i-th tile row
in units of CTBs. The value of row_height_minus1[i] shall be equal to RowHeight[i] − 1.
When not present, the value of row_height_minus1[i] is inferred to be equal to
RowHeight[i] − 1.</ADD>
brick_split_flag[i] equal to 1 specifies that the i-th tile is divided into two or
more bricks. brick_split_flag[i] equal to 0 specifies that the i-th tile is not divided
into two or more bricks. When not present, the value of brick_split_flag[i] is inferred
to be equal to 0.
uniform_brick_spacing_flag[i] equal to 1 specifies that horizontal brick
boundaries are distributed uniformly across the i-th tile and signalled using the syntax
element brick_height_minus1[i]. uniform_brick_spacing_flag[i] equal to 0
specifies that horizontal brick boundaries may or may not be distributed uniformly
across i-th tile and signalled using the syntax element num_brick_rows_minus2[i]
and a list of syntax elements brick_row_height minus1[i][j]. When not present, the
value of uniform brick_spacing_flag[i] is inferred to be equal to 1.
brick_height_minus1[i] plus 1 specifies the height of the brick rows
excluding the bottom brick in the i-th tile in units of CTBs when
uniform_brick_spacing_flag[i] is equal to 1. When present, the value of
brick_height_minus1 shall be in the range of 0 to RowHeight[i] − 2, inclusive.
When not present, the value of brick_height_minus1[i] is inferred to be equal to
RowHeight[i] − 1.
num_brick_rows_minus2[i] plus 2 specifies the number of bricks
partitioning the i-th tile when uniform_brick_spacing_flag[i] is equal to 0. When
present, the value of num_brick_rows_minus2[i] shall be in the range of 0 to
RowHeight[i] − 2, inclusive. If brick_split_flag[i] is equal to 0, the value of
num_brick_rows_minus2[i] is inferred to be equal to −1. Otherwise, when
uniform_brick_spacing_flag[i] is equal to 1, the value of
num_brick_rows_minus2[i] is inferred as specified in 6.5.1.
brick_row_height_minus1[i][j] plus 1 specifies the height of the j-th brick
in the i-th tile in units of CTBs when uniform_tile_spacing_flag is equal to 0.

As shown in Table 4, video encoder 200 may encode, in the PPS that is applicable to a picture of video data, a syntax element row_height_minus1 that indicates the height of the i-th tile row of the picture of video data minus 1. Video encoder 200 may also encode, in the PPS, conditional statements if(row_height_minus1 [i]>0) and if(row_height_minus1 [i]>1) to replace conditional statements if(Row Height[i]>1) and if(Row Height[i]>2), respectively.

Video decoder 300 may decode the syntax element row_height_minus1 in the PPS to determine the height of the i-th tile row of the picture of video data minus 1.

When video decoder 300 decodes the conditional statement if(row_height_minus1 [i]>0), because video decoder has determined the height of the i-th tile row of the picture of video data minus 1 from decoding the syntax element row_height_minus1 in the PPS, video decoder 300 may evaluate the conditional statement if(row_height_minus1 [i]>0) to determine whether the PPS signals a syntax element brick_split_flag[i] indicative of whether an i-th tile of the picture of video data is divided into two or more bricks. If video decoder 300, when evaluating the conditional statement if(row_height_minus1 [i]>0)), determines that the conditional statement evaluates to true (i.e., the value of row_height_minus1 is greater than 0), video decoder 300 may decode, in PPS a syntax element brick_split_flag[i] indicative of whether an i-th tile of the picture of video data is divided into two or more bricks. However, if video decoder 300, when evaluating the conditional statement if(row_height_minus1 [i]>0), determines that the conditional statement evaluates to false (i.e., the value of row_height_minus1 [i] is not greater than 0), video decoder 300 may instead infer that an i-th tile of the picture of video data is not divided into two or more bricks.

Similarly, when video decoder 300 decodes the conditional statement if(row_height_minus1 [i]>1), video decoder 300 may evaluate the conditional statement if(row_height_minus1 [i]>1) to determine whether the PPS signals a syntax element uniform_brick_spacing_flag[i] indicative of whether one or more horizontal brick boundaries are uniformly distributed across an i-th tile of the picture of video data is divided into two or more bricks. If video decoder 300, when evaluating the conditional statement if(row_height_minus1 [i]>1), determines that the conditional statement evaluates to true (i.e., the value of row_height_minus1 [i] is greater than 1), video decoder 300 may decode, in PPS a syntax element uniform_brick_spacing_flag[i] indicative of whether one or more horizontal brick boundaries are uniformly distributed across an i-th tile of the picture of video data is divided into two or more bricks. However, if video decoder 300, when evaluating the conditional statement if(row_height_minus1 [i]>1), determines that the conditional statement evaluates to false (i.e., the value of row_height_minus1 [i] is not greater than 1), video decoder 300 may instead infer that one or more horizontal brick boundaries are uniformly distributed across an i-th tile of the picture of video data is divided into two or more bricks.

As described above, in VVC Draft 6, the syntax elements brick_split_flag[i] and uniform_brick_spacing[i] in a PPS may be conditioned on the parameter RowHeight[i]. However, the index of the parameter RowHeight[i] for brick_split_flag[i] and uniform_brick_spacing[i] should be RowHeight[i % (num_tile_columns_minus1+1)] instead of RowHeight[i] because the value of indexes of RowHeight is in the range of 0 to num_tile_rows_minus1, inclusive In accordance with aspects of the present disclosure, the parameter RowHeight[i] may be replaced with a new parameter TileHeight[i] in the syntax, where TileHeight[i] is derived as RowHeight[i (num_tile_columns_minus1+1)] in subclause 6.5.1. of VCC Draft 6 version 14. As such, the syntax elements brick_split_flag[i] and uniform_brick_spacing[i] in a PPS may be conditioned on the parameter TileHeight[i] rather than RowHeight[i].

The syntax changes to VVC Draft 6 version 14 are described in Table 5, where content between <DELETE></DELETE> are deleted from the syntax while content between <ADD></ADD> are added to the syntax.

TABLE 5

| Section 6.5.1 in VVC Draft 6 version 14: |
|---|
| The list colWidth[ i ] for i ranging from 0 to num_tile_columns_minus1, inclusive, specifying the width of the i-th tile column in units of CTBs, is derived, and when uniform_tile_spacing_flag is equal to 1, the value of num_tile_columns_minus1 is inferred, as follows:<br>    if( uniform_tile_spacing_flag ) {<br>  remainingWidthInCtbsY = PicWidthInCtbsY<br>  i = 0<br>  while( remainingWidthInCtbsY > ( tile_cols_width_minus1 + 1 ) ) {<br>    colWidth[ i++ ] = tile_cols_width_minus1 + 1<br>    remainingWidthInCtbsY −= ( tile_cols_width_minus1 + 1 )<br>  }<br>  colWidth[ i ] = remainingWidthInCtbsY<br>  num_tile_columns_minus1 = i<br>} else {<br>  colWidth[ num_tile_columns_minus1 ] = PicWidthInCtbsY    (6-1)<br>  for( i = 0; i < num_tile_columns_minus1; i++ ) {<br>    colWidth[ i ] = tile_column_width_minus1[ i ] + 1<br>    colWidth[ num_tile_columns_minus1 ] −= colWidth[ i ]<br>  }<br>}<br>The list RowHeight[ j ] for j ranging from 0 to num_tile_rows_minus1, inclusive, specifying the height of the j-th tile row in units of CTBs, is derived, and when uniform_tile_spacing_flag is equal to 1, the value of num_tile_rows_minus1 is inferred, as follows:<br>    if( uniform_tile_spacing_flag ) {<br>  remainingHeightInCtbsY = PicHeightInCtbsY<br>  i = 0<br>  while( remainingHeightInCtbsY > ( tile_rows_height_minus1 + 1 ) ) {<br>    RowHeight[ i++ ] = tile_rows_height_minus1 + 1<br>    remainingHeightInCtbsY −= ( tile_rows_height_minus1 + 1 )<br>  }<br>  RowHeight[ i ] = remainingHeightInCtbsY<br>  num_tile_rows_minus1 = i<br>} else { |

TABLE 5-continued

Section 6.5.1 in VVC Draft 6 version 14:

```
        RowHeight[ num_tile_rows_minus1 ] = PicHeightInCtbsY        (6-2)
        for( j = 0; j < num_tile_rows_minus1; j++ ) {
            RowHeight[ j ] = tile_row_height_minus1[ j ] + 1
            RowHeight[ num_tile_rows_minus1 ] −= RowHeight[ j ]
        }
    }
}
        <ADD>The list TileHeight [ k ] for k ranging from 0 to NumTilesInPic − 1,
inclusive, specifying the height of the k-th tile in units of CTBs, is derived as follows:
        for( k = 0; k < NumTilesInPic; k++ ) {
            TileHeight[ k ] = RowHeight[ k % (num_tile_columns_minus1 +
1) ]
        }</ADD>
```

Section 7.3.2.4 in VVC Draft 6 version 14:

| | Descriptor |
|---|---|
| pic_parameter_set_rbsp( ) { | |
| ... | |
|    single_tile_in_pic_flag | u(1) |
|    if( !single_tile_in_pic_flag ) { | |
|      uniform_tile_spacing_flag | u(1) |
|      if( uniform_tile_spacing_flag ) { | |
|         tile_cols_width_minus1 | ue(v) |
|         tile_rows_height_minus1 | ue(v) |
|      } else { | |
|         num_tile_columns_minus1 | ue(v) |
|         num_tile_rows_minus1 | ue(v) |
|         for( i = 0; i < num_tile_columns_minus1; i++ ) | |
|            tile_column_width_minus1[ i ] | ue(v) |
|         for( i = 0; i < num_tile_rows_minus1; i++ ) | |
|            tile_row_height_minus1[ i ] | ue(v) |
|      } | |
|      brick_splitting_present_flag | u(1) |
|      if( uniform_tile_spacing_flag && brick_splitting_present_flag ) | |
|         num_tiles_in_pic_minus1 | ue(v) |
|      for( i = 0; brick_splitting_present_flag && i <= num_tiles_in_pic_minus + 1; i++ ) { | |
|         if( RowHeight[ i ] > 1 ) | |
|            brick_split_flag[ i ] | u(1) |
|         if( brick_split_flag[ i ] ) { | |
|            if( RowHeight[ i ] > 2 ) | |
|                uniform_brick_spacing_flag[ i ] | u(1) |
|            if( uniform_brick_spacing_flag[ i ] ) | |
|                brick_height_minus1[ i ] | ue(v) |
|            else { | |
|                num_brick_rows_minus2[ i ] | ue(v) |
|                for( j = 0; j <= num_brick_rows_minus2[ i ]; j++ ) | |
|                   brick_row_height_minus1[ i ][ j ] | ue(v) |
|            } | |
|         } | |
|      } | |

Section 7.4.3.4 in VVC Draft 6 version 14:
single_tile_in_pic_flag equal to 1 specifies that there is only one tile in each picture referring to the PPS. single_tile_in_pic_flag equal to 0 specifies that there is more than one tile in each picture referring to the PPS.

NOTE - In absence of further brick splitting within a tile, the whole tile is referred to as a brick. When a picture contains only a single tile without further brick splitting, it is referred to as a single brick.

It is a requirement of bitstream conformance that the value of single_tile_in_pic_flag shall be the same for all PPSs that are referred to by coded pictures within a CVS.

uniform_tile_spacing_flag equal to 1 specifies that tile column boundaries and likewise tile row boundaries are distributed uniformly across the picture and signalled using the syntax elements tile_cols_width_minus1 and tile_rows_height_minus1. uniform_tile_spacing_flag equal to 0 specifies that tile column boundaries and likewise tile row boundaries may or may not be distributed uniformly across the picture and signalled using the syntax elements num_tile_columns_minus1 and num_tile_rows_minus1 and a list of syntax element pairs tile_column_width_minus1[ i ] and tile_row_height_minus1[ i ]. When not present, the value of uniform_tile_spacing_flag is inferred to be equal to 1.

tile_cols_width_minus1 plus 1 specifies the width of the tile columns excluding the right-most tile column of the picture in units of CTBs when

TABLE 5-continued

Section 6.5.1 in VVC Draft 6 version 14:

uniform_tile_spacing_flag is equal to 1. The value of tile_cols_width_minus1 shall be in the range of 0 to PicWidthInCtbsY − 1, inclusive. When not present, the value of tile_cols_width_minus1 is inferred to be equal to PicWidthInCtbsY − 1.

tile_rows_height_minus1 plus 1 specifies the height of the tile rows excluding the bottom tile row of the picture in units of CTBs when uniform_tile_spacing_flag is equal to 1. The value of tile_rows_height_minus1 shall be in the range of 0 to PicHeightInCtbsY − 1, inclusive. When not present, the value of tile_rows_height_minus1 is inferred to be equal to PicHeightInCtbsY − 1.

num_tile_columns_minus1 plus 1 specifies the number of tile columns partitioning the picture when uniform_tile_spacing_flag is equal to 0. The value of num_tile_columns_minus1 shall be in the range of 0 to PicWidthInCtbsY − 1, inclusive. If single_tile_in_pic_flag is equal to 1, the value of num_tile_columns_minus1 is inferred to be equal to 0. Otherwise, when uniform_tile_spacing_flag is equal to 1, the value of num_tile_columns_minus1 is inferred as specified in clause 6.5.1.

num_tile_rows_minus1 plus 1 specifies the number of tile rows partitioning the picture when uniform_tile_spacing_flag is equal to 0. The value of num_tile_rows_minus1 shall be in the range of 0 to PicHeightInCtbsY − 1, inclusive. If single_tile_in_pic_flag is equal to 1, the value of num_tile_rows_minus1 is inferred to be equal to 0. Otherwise, when uniform_tile_spacing_flag is equal to 1, the value of num_tile_rows_minus1 is inferred as specified in clause 6.5.1.

The variable NumTilesInPic is set equal to ( num_tile_columns_minus1 + 1 ) * ( num_tile_rows_minus1 + 1 ).

When single_tile_in_pic_flag is equal to 0, NumTilesInPic shall be greater than 1.

tile_column_width_minus1[ i ] plus 1 specifies the width of the i-th tile column in units of CTBs.

tile_row_height_minus1[ i ] plus 1 specifies the height of the i-th tile row in units of CTBs.

brick_splitting_present_flag equal to 1 specifies that one or more tiles of pictures referring to the PPS may be divided into two or more bricks. brick_splitting_present flag equal to 0 specifies that no tiles of pictures referring to the PPS are divided into two or more bricks.

num_tiles_in_pic_minus1 plus 1 specifies the number of tiles in each picture referring to the PPS. The value of num_tiles_in_pic_minus1 shall be equal to NumTilesInPic − 1. When not present, the value of num_tiles_in_pic_minus1 is inferred to be equal to NumTilesInPic − 1.

brick_split_flag[ i ] equal to 1 specifies that the i-th tile is divided into two or more bricks. brick_split_flag[ i ] equal to 0 specifies that the i-th tile is not divided into two or more bricks. When not present, the value of brick_split_flag[ i ] is inferred to be equal to 0.

uniform_brick_spacing_flag[ i ] equal to 1 specifies that horizontal brick boundaries are distributed uniformly across the i-th tile and signalled using the syntax element brick_height_minus1[ i ]. uniform_brick_spacing_flag[ i ] equal to 0 specifies that horizontal brick boundaries may or may not be distributed uniformly across i-th tile and signalled using the syntax element num_brick_rows_minus2[ i ] and a list of syntax elements brick_row_height_minus1[ i ][ j ]. When not present, the value of uniform_brick_spacing_flag[ i ] is inferred to be equal to 1.

brick_height_minus1[ i ] plus 1 specifies the height of the brick rows excluding the bottom brick in the i-th tile in units of CTBs when uniform_brick_spacing_flag[ i ] is equal to 1. When present, the value of brick_height_minus1 shall be in the range of 0 to RowHeight[ i ] − 2, inclusive. When not present, the value of brick_height_minus1[ i ] is inferred to be equal to RowHeight[ i ] − 1.

num_brick_rows_minus2[ i ] plus 2 specifies the number of bricks partitioning the i-th tile when uniform_brick_spacing_flag[ i ] is equal to 0. When present, the value of num_brick_rows_minus2[ i ] shall be in the range of 0 to RowHeight[ i ] − 2, inclusive. If brick_split_flag[ i ] is equal to 0, the value of num_brick_rows_minus2[ i ] is inferred to be equal to − 1. Otherwise, when uniform_brick_spacing_flag[ i ] is equal to 1, the value of num_brick_rows_minus2[ i ] is inferred as specified in 6.5.1.

brick_row_height_minus1[ i ][ j ] plus 1 specifies the height of the j-th brick in the i-th tile in units of CTBs when uniform_tile_spacing_flag is equal to 0.

Aspects of the present disclosure are directed to addressing issues related to subpictures extraction. A picture of video data may have one or more subpictures, where each subpicture may contain one or more slices that collectively cover a rectangular region of the picture, and the video coder may extract one or more subpictures from a picture of video data. Such issues regarding subpictures extraction include how to extract subpictures from an original picture of video data, how the subpicture ID is designed to identify which subpictures are extracted, and how to interact between different parameter sets (e.g., PPS and SPS) and slice header.

Figure 3:
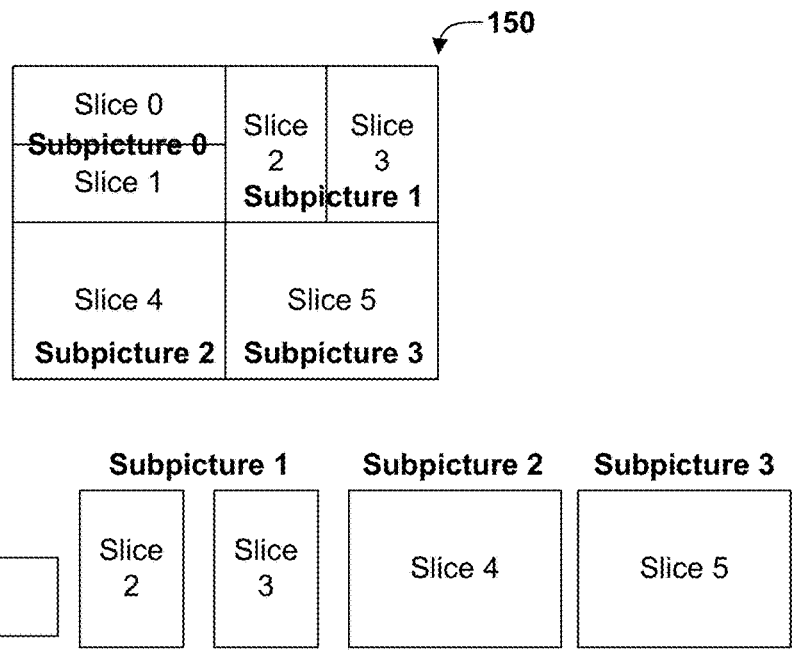
FIG. 3 is a conceptual diagram illustrating an example subpicture layout in accordance with aspects of the present disclosure.
Figure 5:
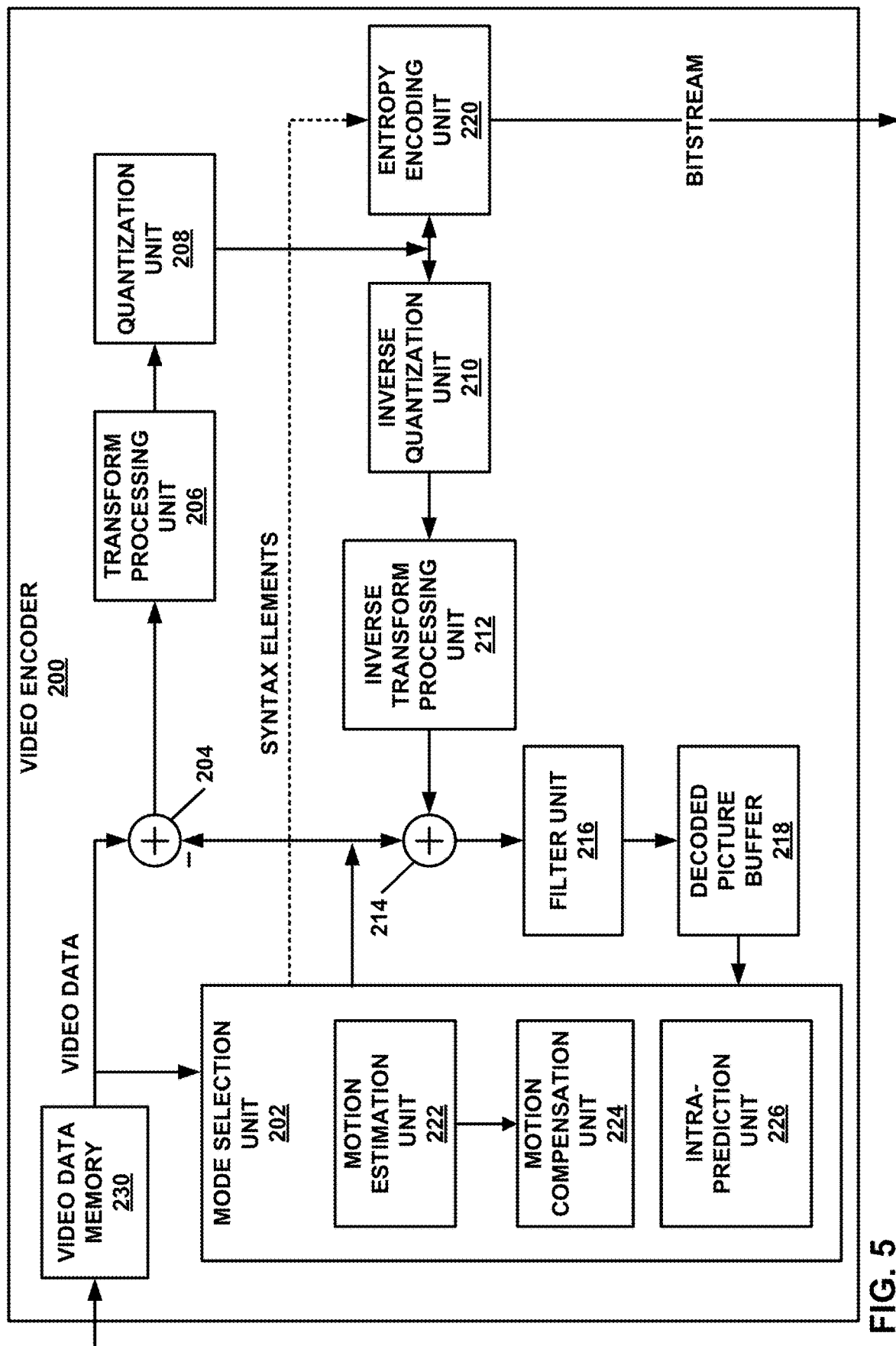
FIG. 5 is a block diagram illustrating an example video encoder that may perform the techniques of this disclosure.

FIG. 3 is a conceptual diagram illustrating an example subpicture layout in accordance with aspects of the present disclosure. As shown in FIG. 5, an example picture 150 of video data may include 4 subpictures: Subpicture 0, Subpicture 1, Subpicture 2, and Subpicture 3, and 6 slices: Slice 0 Slice 1, Slice 2, Slice 3, Slice 4, Slice 5, where each subpicture includes at least one slice. Subpicture 0 includes Slice 0 and Slice 1, Subpicture 1 includes Slice 2 and Slice 3, Subpicture 2 includes Slice 4, and Subpicture 3 includes Slice 5.

To address issues related to subpictures extraction, aspects of the present disclosure propose the following techniques:

1) adding a PPS flag num_subpicture_in_pic_minus1 to specify the number of subpictures extracted from the original picture. Specifically, the PPS referenced by a picture of video data may include a syntax element num_subpicture_in_pic_minus1 that indicates the number of subpictures extracted from the picture. The value of the syntax element num_subpicture_in_pic_minus1 may be the number of subpictures extracted from the picture minus one, and the value of the syntax element num_subpicture_in_pic_minus1 may be in the range of 0 to the number of subpictures in the picture minus 1, inclusive, to indicate the number of subpictures extracted from the picture.

2) Adding PPS syntax elements subpicture_id[i] to specify the subpicture IDs of the extracted subpictures. Specifically, the PPS referenced by a picture of video data may include syntax elements subpicture_id[i] that indicate the subpicture ID for each of the subpictures in the picture. The maximum value of i may be the value of the syntax element num_subpicture_in_pic_minus1. Further, the value of subpicture_id[i] may be in the range of 0 to the number of subpictures in the picture minus 1, inclusive.

3) Adding a slice header syntax element slice_subpicture_id to specify the value of subpicture_id for the slice in use. The value of the syntax element slice_subpicture_id may be required to be one of the values of subpicture_id[i].

An SPS that is applicable to a picture of video data may include a syntax element subpic_grid_idx[i][j] indicative of the indexes of the subpictures in the picture, and SPS syntax can derive the subpicture index for each grid from the syntax element subpic_grid_idx[i][j]. In the example depicted in FIG. 3, the value of subpic_grid_idx[i][j] may be in the range of 0 to 3, inclusive.

In the example of FIG. 3, if Subpicture 1 and Subpicture 3 are to be extracted from picture 150, then the proposed syntax elements num_subpicture_in_pic_minus1 and subpicture_id[i] in the PPS that applies to picture 150 and the syntax element slice_subpicture_id in the slice header are signaled as illustrated in Table 6 below and also in FIG. 6:

TABLE 6

| | Suppose subpicture 1 and 3 are extracted |
|---|---|
| SPS | subpic_grid_idx[NumSubPicGridRows][NumSubPicGridCols]= {0, 1, 2, 3} |
| PPS | num_subpicture_in_pic_minus1 = 1<br>subpicture_id[0] = 1<br>subpicture_id[1] = 3 |
| Slice | slice_subpicture_id = 1 in Slice 2 and 3<br>slice_subpicture_id = 3 in Slice 5 |

Figure 4:
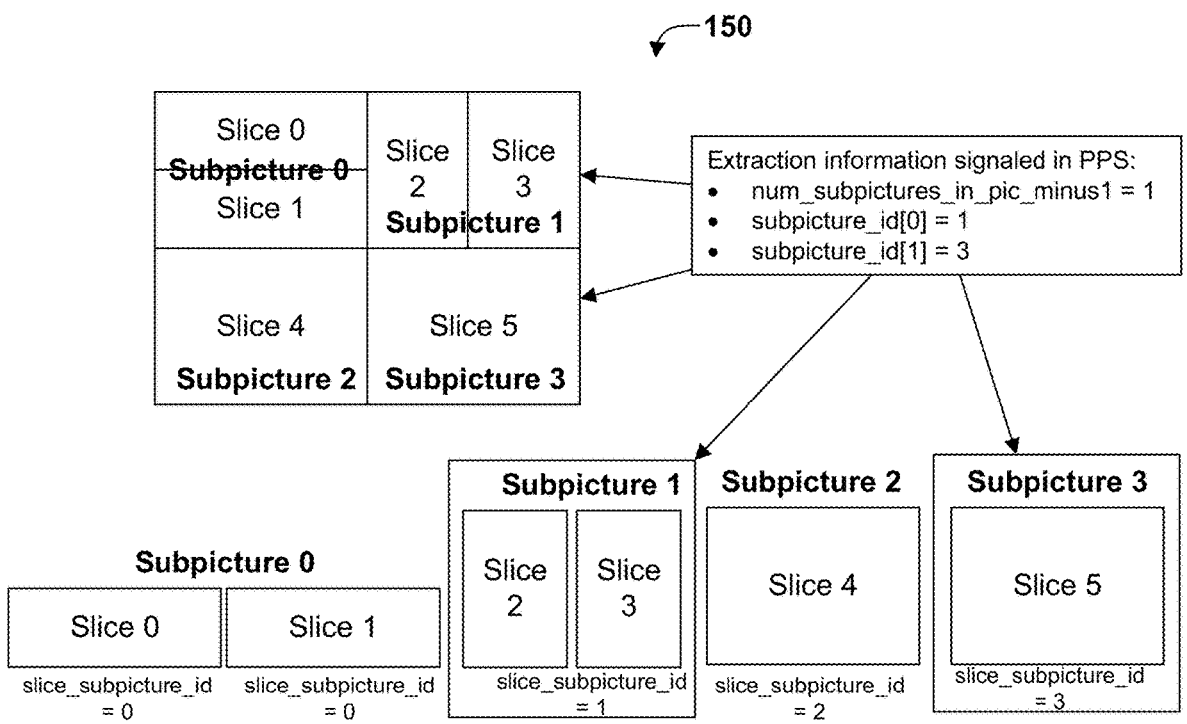
FIG. 4 illustrates the extraction of subpictures from the example picture of FIG. 3.

FIG. 4 illustrates the extraction of subpictures from the example picture 150 of FIG. 3. As shown in FIG. 4, Subpicture 1 and Subpicture 3 from picture 150 are extracted. To specify that Subpicture 1 and Subpicture 3 are extracted from picture 150, the PPS applied to picture 150 may include the syntax element num_subpicture_in_pic_minus1 having a value of 1 to indicate that two subpictures are extracted from picture 150. The PPS applied to picture 150 may also include two subpicture_id[i] syntax elements that indicate the two subpictures that are extracted from picture 150. Specifically, the PPS may include syntax element subpicture_id[0] having a value of 1 to indicate that the first subpicture extracted from picture 150 has a subpicture ID of 1, and may include syntax element subpicture_id[1] having a value of 3 to indicate that the second subpicture extracted from picture 150 has a subpicture ID of 3.

As shown in FIG. 4, Subpicture 1 includes Slice 2 and Slice 3, and Subpicture 3 includes Slice 5. Thus, the slice headers for each of Slice 2, Slice 3, and Slice 5 may include a syntax element slice_subpicture_id indicative of the subpicture to which the slice belongs. Accordingly, the slice header for Slice 2 as well as the slice header for Slice 3 may each include a syntax element slice_subpicture_id having a value of 1 to indicate that Slice 2 and Slice 3 belong in Subpicture 1. Similarly, the slice header for Slice 5 may include a syntax element slice_subpicture_id having a value of 3 to indicate that Slice 5 belong in Subpicture 3.

The syntax changes to VVC Draft 6 version 14 are described in Table 7, where content between <DELETE></DELETE> are deleted from the syntax while content between <ADD></ADD> are added to the syntax.

TABLE 7

| Section 7.3.2.3 in VVC Draft 6 version 14: | |
|---|---|
| | Descriptor |
| seq_parameter_set_rbsp( ) {<br>...<br>  subpics_present_flag<br>  if( subpics_present_flag ) {<br>    max_subpics_minus1<br>    subpic_grid_col_width_minus1<br>    subpic_grid_row_height_minus1<br>    for( i = 0; i < NumSubPicGridRows; i++ )<br>      for( j = 0; j < NumSubPicGridCols; j++ )<br>        subpic_grid_idx[ i ][ j ]<br>  ...| <br><br>u(1)<br><br>u(8)<br>u(v)<br>u(v)<br><br><br>u(v) |

Section 7.4.3.3 in VVC Draft 6 version 14:

subpics_present_flag equal to 1 indicates that subpicture parameters are present in the present in the SPS RBSP syntax. subpics_present_flag equal to 0 indicates that subpicture parameters are not present in the present in the SPS RBSP syntax.

NOTE 2 - When a bitstream is the result of a sub-bitstream extraction process and contains only a subset of the subpictures of the input bitstream to the sub-bitstream extraction process, it might be required to set the value of subpics_present_flag equal to 1 in the RBSP of the SPSs.

TABLE 7-continued

Section 7.3.2.3 in VVC Draft 6 version 14:

max_subpics_minus1 plus 1 specifies the maximum number of subpictures that may be present in the CVS. max_subpics_minus1 shall be in the range of 0 to 254. The value of 255 is reserved for future use by ITU-T | ISO/IEC.
    subpic_grid_col_width_minus1 plus 1 specifies the width of each element of the subpicture identifier grid in units of 4 samples. The length of the syntax element is Ceil( Log2( pic_width_max_in_luma_samples / 4) ) bits.
    The variable NumSubPicGridCols is derived as follows:
        NumSubPicGridCols = (
    pic_width_max_in_luma_samples + subpic_grid_col_width_minus1 * 4 + 3 )
/
        ( subpic_grid_col_width_minus1 * 4 + 4 ) (7-5)
    subpic_grid_row_height_minus1 plus 1 specifies the height of each element of the subpicture identifier grid in units of 4 samples. The length of the syntax element is Ceil( Log2( pic_height_max_in_luma_samples / 4) ) bits.
    The variable NumSubPicGridRows is derived as follows:
        NumSubPicGridRows = (
    pic_height_max_in_luma_samples + subpic_grid_row_height_minus1 * 4 +
3 ) /
        ( subpic_grid_row_height_minus1 * 4 + 4 ) (7-6)
    subpic_grid_idx[ i ][ j ] specifies the subpicture index of the grid position (i, j). The length of the syntax element is Ceil( Log2( max_subpics_minus1 + 1 ) ) bits.
    The variables SubPicTop[ subpic_grid_idx[ i ][ j ] ],
SubPicLeft[ subpic_grid_idx[ i ][ j ] ], SubPicWidth[ subpic_grid_idx [ i ][ j ] ],
SubPicHeight[ subpic_grid_idx[ i ][ j ] ], and NumSubPics are derived as follows:
        NumSubPics = 0
    for( i = 0; i. < NumSubPicGridRows; i++ ) {
    for( j = 0; j < NumSubPicGridCols; j++ ) {
        if(i == 0)
            SubPicTop[ subpic_grid_idx[ i ][ j ] ] = 0
        else if( subpic_grid_idx[ i ][ j ] != subpic_grid_idx[ i − 1 ][ j ] ) {
            SubPicTop[ subpic_grid_idx[ i ][ j ] ] = i
            SubPicHeight[ subpic_grid_idx[ i − 1][ j ] ] =
i − SubPicTop[ subpic_grid_idx[ i − 1 ][ j ] ]
        }
        if ( j == 0)
            SubPicLeft[ subpic_grid_idx[ i ][ j ] ] = 0 (7-7)
        else if (subpic_grid_idx[ i ][ j ] != subpic_grid_idx[ i ][ j − 1 ] ) {
            SubPicLeft[ subpic_grid_idx[ i ][ j ] ] = j
            SubPicWidth[ subpic_grid_idx[ i ][ j ] ] =
j − SubPicLeft[ subpic_grid_idx[ i ][ j − 1 ] ]
        }
        if ( i == NumSubPicGridRows − 1)
            SubPicHeight[ subpic_grid_idx[ i ][ j ] ] =
i − SubPicTop[ subpic_grid_idx[ i − 1 ][ j ] ] + 1
        if (j == NumSubPicGridRows − 1)
            SubPicWidth[ subpic_grid_idx[ i ][ j ] ] =
j − SubPicLeft[ subpic_grid_idx[ i ][ j − 1 ] ] + 1
        if( subpic_grid_idx[ i ][ j ] > NumSubPics)
            NumSubPics = subpic_grid_idx[ i ][ j ]
    }
}

Section 7.3.2.4 in VVC Draft 6 version 14:

| | Descriptor |
|---|---|
| pic_parameter_set_rbsp( ) {<br>   ...<br>   <ADD> num_subpicture_in_pic_minus1<br>   for( i = 0; i <= num_subpicture_in_pic_minus1; i++ ) {<br>      subpicture_id[ i ]<br>   }</ADD><br>   ... | <br><br>ue(v)<br><br><br>ue(v) |

Section 7.4.3.4 in VVC Draft 6 version 14:

<ADD>num_subpicture_in_pic_minus1 plus 1 specifies the number of subpictures in each picture referring to the PPS. The value of num_subpicture_in_pic_minus1 shall be in the range of 0 to NumSubPics, inclusive.</ADD>
    <ADD>subpicture_id[ i ] specifies the subpicture ID of the i-th subpicture in the picture referring to the PPS. The value of subpicture_id[ i ] shall be in the range of 0 to NumSubPics, inclusive.</ADD>

TABLE 7-continued

Section 7.3.2.3 in VVC Draft 6 version 14:

Section 7.3.6.1 in VVC Draft 6 version 14:

| | Descriptor |
|---|---|
| slice_header( ) { | |
| ... | |
|     <ADD>if( subpics_present_flag && NumSubPics > 0 )</ADD> | |
|         <ADD>slice_subpicture_id</ADD> | u(v) |
| ... | |

Section 7.4.7.1 in VVC Draft 6 version 14:

<ADD>slice_subpicture_id specifies the value of subpicture id for the slice in use. The value of slice_subpicture_id shall be in the range of 0 to NumSubPics, inclusive.</ADD>

As can be seen in Table 7, a video coder (e.g., video encoder 200 or video decoder 300) may code, in the PPS, a syntax element num_subpicture_in_pic_minus1 indicative of a number of subpictures in the picture of video data to which the PPS is applicable. That is, video encoder 200 may encode the syntax element num_subpicture_in_pic_minus1 in the PPS, and video decoder 300 may decode the syntax element num_subpicture_in_pic_minus1 in the PPS.

The video coder may also code, in the PPS, a syntax element subpicture_id[i] indicative of a subpicture ID for each subpicture in the picture of video data. That is, video encoder may encode the syntax element subpicture_id[i] indicative of a subpicture ID for each subpicture in the picture of video data, and video decoder 300 may decode the syntax element subpicture_id[i] in the PPS.

The video coder may therefore code the picture of video data in accordance with the syntax element num_subpicture_in_pic_minus and the syntax element subpicture_id[1] in the PPS. Video encoder 200 may encode the picture of video data in accordance with the syntax element num_subpicture_in_pic_minus and the syntax element subpicture_id[1] in the PPS, and video decoder 300 may decode the picture of video data in accordance with the syntax element num_subpicture_in_pic_minus and the syntax element subpicture_id[1] in the PPS.

As can be seen in Table 7, the video coder may also code, in a slice header for a slice of the picture of video data, a syntax element slice_subpicture_id indicative of the subpicture ID for the slice of the picture of video data. That is, video encoder 200 may encode the syntax element slice_subpicture_id in the slice header, and video decoder 300 may decode the syntax element slice_subpicture_id in the slice header.

FIG. 5 is a block diagram illustrating an example video encoder 200 that may perform the techniques of this disclosure. FIG. 5 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 5, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 5 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In some examples, entropy encoding unit 220 may encode NAL units that encapsulate RBSPs for video parameter sets (VPSs), sequence parameter sets (SPSs), and picture parameter sets (PPSs). As such, entropy encoding unit 220 may perform the techniques described herein for reducing parsing dependencies between a PPS and a SPS, such as by encoding, in a PPS, a syntax element indicative of a luma coding tree block size of a picture to which the PPS is applicable. Entropy encoding unit 220 may encode the blocks of the picture to which the PPS is applicable of the video data in accordance with the syntax element in the PPS, such as by encoding a RBSP for the PPS in a bitstream.

Video encoder 200 may output a bitstream that includes the entropy encoded syntax elements, NAL units, and the like needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry and configured to encode, in a picture parameter set (PPS), a syntax element indicative of a luma coding tree block size of a picture to which the PPS is applicable of the video data and encode the picture to which the PPS is applicable of the video data in accordance with the syntax element in the PPS.

Figure 6:
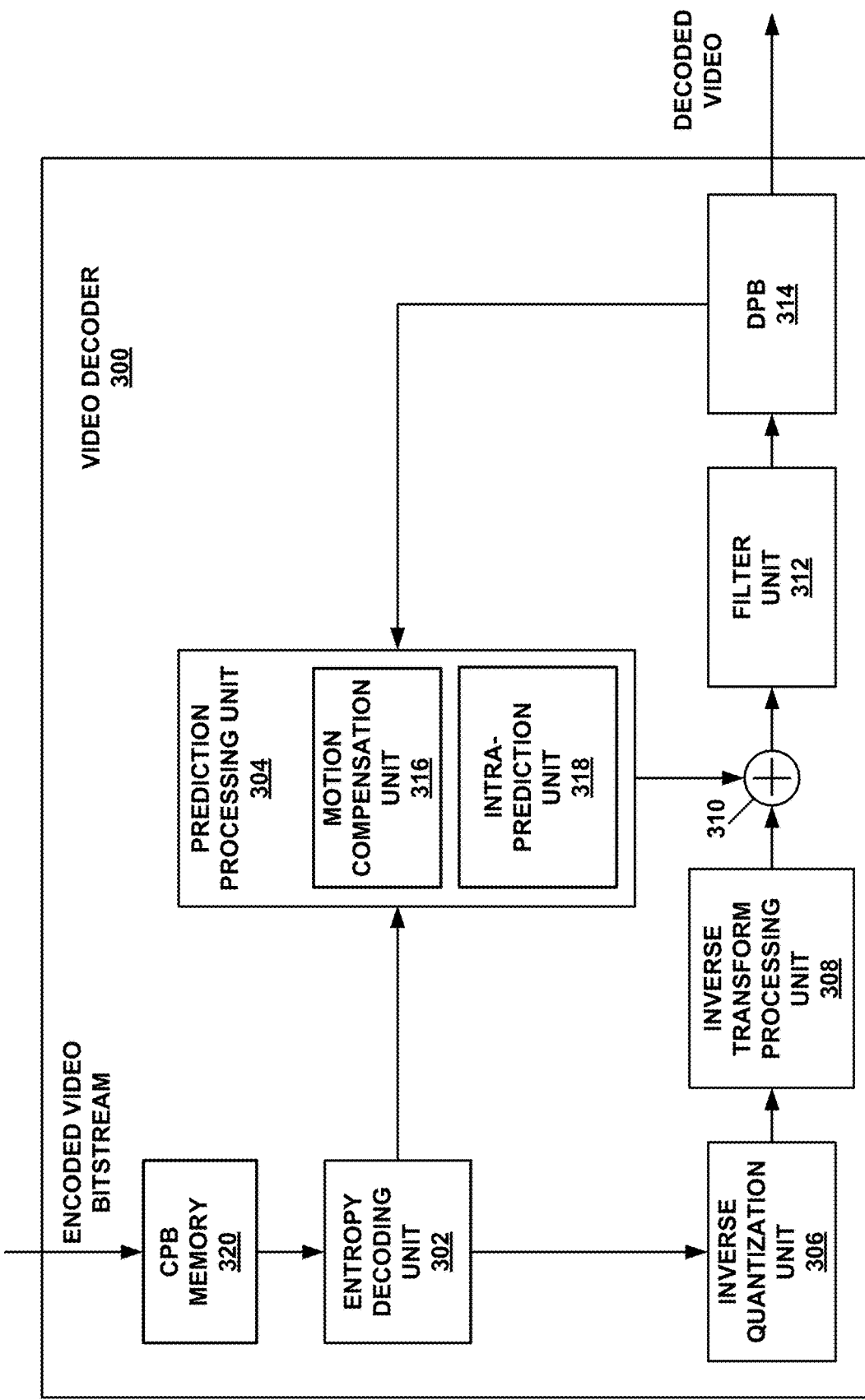
FIG. 6 is a block diagram illustrating an example video decoder that may perform the techniques of this disclosure.

FIG. 6 is a block diagram illustrating an example video decoder 300 that may perform the techniques of this disclosure. FIG. 6 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 6, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 6 are illustrated to assist with understanding the operations performed by video decoder 300. The units may be implemented as fixed-function circuits, programmable circuits, or a combination thereof. Similar to FIG. 5, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

In some examples, entropy decoding unit 302 may decode NAL units in the bitstream that encapsulate RBSPs for video parameter sets (VPSs), sequence parameter sets (SPSs), and picture parameter sets (PPSs). Entropy decoding unit 302 may decode such VPSs, SPSs, and PPSs to derive the values of various parameters for decoding the blocks of video data.

As such, entropy decoding unit 302 may perform the techniques described herein for reducing parsing dependencies between a PPS and a SPS, such as by decoding, in a PPS, a syntax element indicative of a luma coding tree block size of a picture to which the PPS is applicable. Video decoder 300 may therefore decode the blocks of the picture to which the PPS is applicable of the video data in accordance with the syntax element in the PPS.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 5).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 5). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to decode, in a picture parameter set (PPS), a syntax element indicative of a luma coding tree block size of a picture to which the PPS is applicable of the video data and decode the picture to which the PPS is applicable of the video data in accordance with the syntax element in the PPS.

Figure 7:
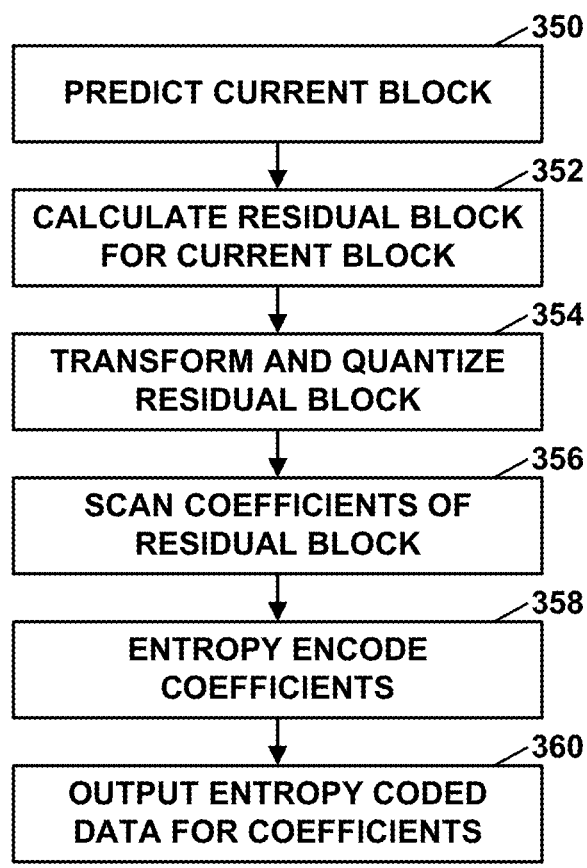
FIG. 7 is a flowchart illustrating an example method for encoding a current block in accordance with the techniques of this disclosure.

FIG. 7 is a flowchart illustrating an example method for encoding a current block in accordance with the techniques of this disclosure. The current block may comprise a current CU. Although described with respect to video encoder 200 (FIGS. 1 and 5, it should be understood that other devices may be configured to perform a method similar to that of FIG. 7. In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356).

During the scan, or following the scan, video encoder 200 may entropy encode the transform coefficients (358). For example, video encoder 200 may encode the transform coefficients using CAVLC or CABAC. Video encoder 200 may also encode in a picture parameter set (PPS), a syntax element indicative of a luma coding tree block size of a picture to which the PPS is applicable of the video data, and may entropy encode the picture to which the PPS is applicable of the video data in accordance with the syntax element in the PPS. Video encoder 200 may then output the entropy encoded data of the block (360).

Figure 8:
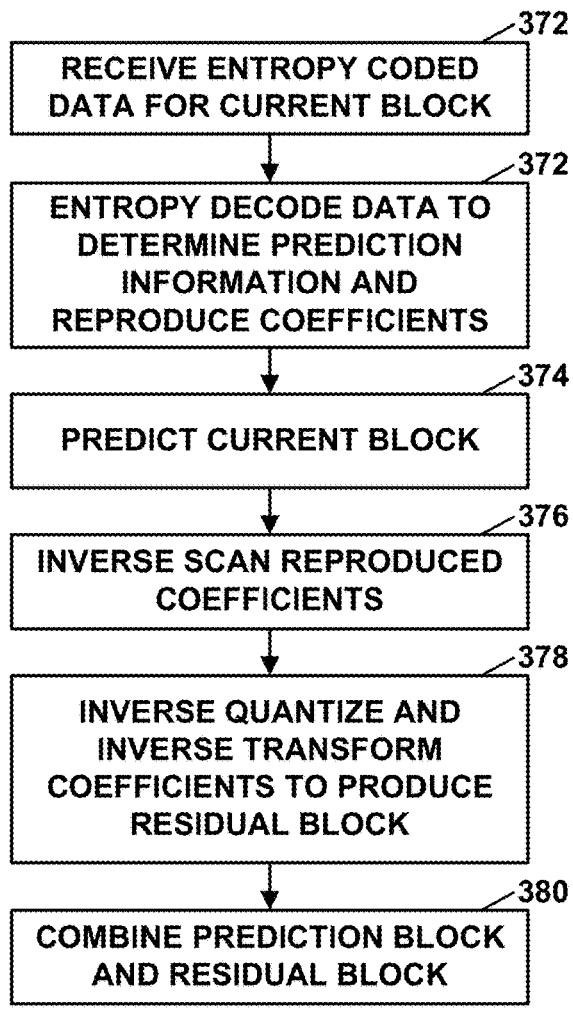
FIG. 8 is a flowchart illustrating an example method for decoding a current block in accordance with the techniques of this disclosure.

FIG. 8 is a flowchart illustrating an example method for decoding a current block of video data in accordance with the techniques of this disclosure. The current block may comprise a current CU. Although described with respect to video decoder 300 (FIGS. 1 and 6, it should be understood that other devices may be configured to perform a method similar to that of FIG. 8.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may also decode, in a picture parameter set (PPS), a syntax element indicative of a luma coding tree block size of a picture to which the PPS is applicable of the video data, and may decode the picture to which the PPS is applicable of the video data in accordance with the syntax element in the PPS.

Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 9:
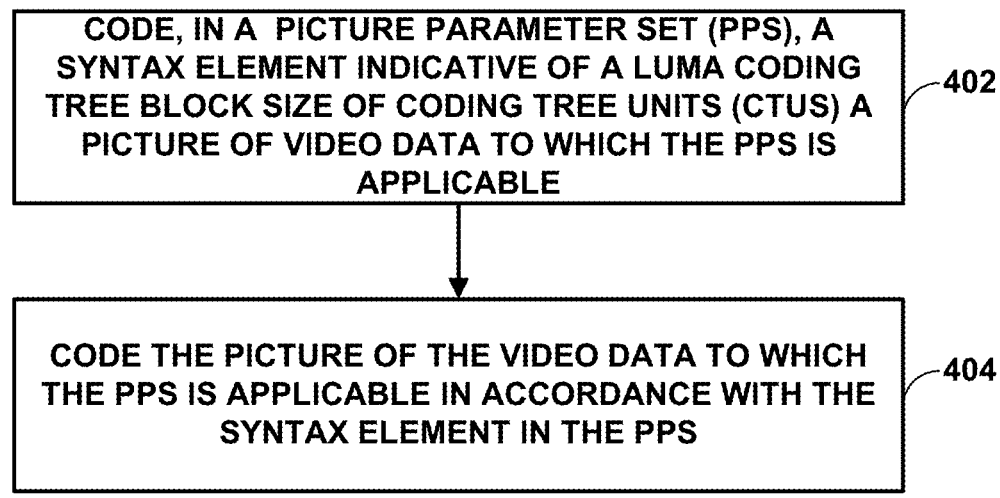
FIG. 9 is a flowchart illustrating an example technique for signaling parameters of a picture parameter set (PPS) in ways that reduce parsing dependencies with a sequence parameter set (SPS) in accordance with the techniques of this disclosure.

FIG. 9 is a flowchart illustrating an example technique for signaling parameters of a picture parameter set (PPS) in ways that reduce parsing dependencies with a sequence parameter set (SPS) in accordance with the techniques of this disclosure. Although described with respect to video encoder 200 (FIGS. 1 and 5) and video decoder 300 (FIGS. 1 and 6), it should be understood that other devices may be configured to perform a method similar to that of FIG. 9.

As shown in FIG. 9, one or more processors of a video coder, such as video encoder 200 or video decoder 300, may code, in a picture parameter set (PPS), a syntax element indicative of a luma coding tree block size of coding tree units (CTUs) of a picture of video data to which the PPS is applicable (402). The one or more processors of the video coder may code the picture of the video data to which the PPS is applicable in accordance with the syntax element in the PPS (404).

In some examples, the syntax element indicative of the luma coding tree block size of the CTUs of the picture of the video data is indicative of the luma coding tree block size of the CTUs of the picture of the video data minus 5. In some examples, the syntax element comprises a syntax element pps_log_2_ctu_size_minus5. In some examples, the syntax element pps_log_2_ctu_size_minus5 has a value that is the same as a syntax element log_2_ctu_size_minus5 in a sequence parameter set (SPS) that is applicable to the picture of the video data In some examples, one or more processors of the video coder may further code, in the PPS, a conditional loop having a condition that is based at least in part on a number of tiles in the picture of the video data. The one or more processors of the video coder may further determine the number of tiles in the picture of the video data based at least in part on the luma coding block tree size of the picture of the video data indicated by the syntax element and iterate the conditional loop based at least in part on the number of tiles in the picture of the video data.

In some examples, the PPS does not include a second syntax element indicative of a number of tiles in the picture of the video data.

In some examples, one or more processors of the video coder may further code, in the PPS, a conditional statement having a condition that is based at least in part on a height of an i-th tile row of the picture of the video data. The one or more processors of the video coder may further determine, based at least in part on the luma coding block tree size of the picture of the video data indicated by the syntax element, the height of the i-th tile row of the picture of the video data.

In some examples, the one or more processors of the video coder may further infer, based on the height of the i-th tile row of the picture of the video data, infer that an i-th tile of the picture of the video data is not divided into two or more bricks. In some examples, the one or more processors of the video coder may further infer, based on the height of the i-th tile row of the picture of the video data, that one or more horizontal brick boundaries are uniformly distributed across an i-th tile of the picture of the video data is divided into two or more bricks.

In some examples, where the syntax element comprises a first syntax element, the one or more processors of the video coder may further code, in the PPS, a second syntax element indicative of a number of subpictures in the picture of the video data, code, in the PPS, a third syntax element indicative of a subpicture ID for each subpicture in the picture of the video data, and code the picture of video data in accordance with the second syntax element in the PPS and the third syntax element in the PPS.

In some examples, the one or more processors of the video coder may further code, in a slice header for a slice of the picture of the video data, a fourth syntax element indicative of the subpicture ID for the slice of the picture of the video data, and code the picture of the video data in accordance with the fourth syntax element in the slice header.

In some examples, coding may comprise decoding, such that the video coder comprises video decoder 300. In some examples, the video coder may display the picture of the video data.

In some examples, coding may comprise encoding, such that the video coder comprises video encoder 200. In some examples, the video coder may capture the picture of the video data.

This disclosure contains the following examples.

Example 1. A method of coding video data, the method comprising: signaling one or more brick information for a tile of video data, wherein a value of the one or more brick information conforms to a value of a row height of the tile; and coding the video data.

Example 2. The method of Example 1, wherein the one or more brick information includes a brick_split_flag, and wherein a value of the brick_split_flag is zero if the value of the row height of the tile is one.

Example 3. The method of Example 1, wherein the one or more brick information includes a brick_split_flag, and wherein a value of the brick_split_flag is one if the value of the row height of the tile is two.

Example 4. The method of any of Examples 1-3, wherein coding comprises decoding.

Example 5. The method of any of Examples 1-4, wherein coding comprises encoding.

Example 6. A method of coding video data, the method comprising: determining, for a tile in the video data, whether to signal one or more brick information for the tile based at least in part on a syntax element that specifies a value of a row height for the tile; and coding the video data based at least in part on the determination of whether to signal the one or more brick information for the tile.

Example 7. The method of Example 6, further comprising: inferring the value of the row height for the tile if the syntax element is not present.

Example 8. The method of any of Examples 6-7, wherein coding comprises decoding.

Example 9. The method of any of Examples 6-8, wherein coding comprises encoding.

Example 10. A method of coding video data, the method comprising: signaling one or more syntax elements indicative of one or more subpictures extracted from a picture in the video data; and coding the video data based at least in part on the one or more syntax elements.

Example 11. The method of Example 10, wherein coding comprises decoding.

Example 12. The method of any of Examples 10 and 11, wherein coding comprises encoding.

Example 13. A device for coding video data, the device comprising one or more means for performing the method of any of Examples 1-5.

Example 14. The device of Example 13, wherein the one or more means comprise one or more processors implemented in circuitry.

Example 15. The device of any of Examples 13 and 14, further comprising a memory to store the video data.

Example 16. The device of any of Examples 13-15, further comprising a display configured to display decoded video data.

Example 17. The device of any of Examples 13-16, wherein the device comprises one or more of a camera, a computer, a mobile device, a broadcast receiver device, or a set-top box.

Example 18. The device of any of Examples 13-17, wherein the device comprises a video decoder.

Example 19. The device of any of Examples 13-18, wherein the device comprises a video encoder.

Example 20. A device for coding video data, the device comprising one or more means for performing the method of any of Examples 6-9.

Example 21. The device of Example 20, wherein the one or more means comprise one or more processors implemented in circuitry.

Example 22. The device of any of Examples 20 and 21, further comprising a memory to store the video data.

Example 23. The device of any of Examples 20-22, further comprising a display configured to display decoded video data.

Example 24. The device of any of Examples 20-23, wherein the device comprises one or more of a camera, a computer, a mobile device, a broadcast receiver device, or a set-top box.

Example 25. The device of any of Examples 20-24, wherein the device comprises a video decoder.

Example 26. The device of any of Examples 20-25, wherein the device comprises a video encoder.

Example 27. A device for coding video data, the device comprising one or more means for performing the method of any of Examples 10-12.

Example 28. The device of Example 27, wherein the one or more means comprise one or more processors implemented in circuitry.

Example 29. The device of any of Examples 27 and 28, further comprising a memory to store the video data.

Example 30. The device of any of Examples 27-29, further comprising a display configured to display decoded video data.

Example 31. The device of any of Examples 27-30, wherein the device comprises one or more of a camera, a computer, a mobile device, a broadcast receiver device, or a set-top box.

Example 32. The device of any of Examples 27-31, wherein the device comprises a video decoder.

Example 33. The device of any of Examples 27-32, wherein the device comprises a video encoder.

Example 34. A computer-readable storage medium having stored thereon instructions that, when executed, cause one or more processors to perform the method of any of Examples 1-5.

Example 35. A computer-readable storage medium having stored thereon instructions that, when executed, cause one or more processors to perform the method of any of Examples 6-9.

Example 36. A computer-readable storage medium having stored thereon instructions that, when executed, cause one or more processors to perform the method of any of Examples 10-12.

Example 37. A device for coding video data, the device comprising: means for signaling one or more brick information for a tile of video data, wherein a value of the one or more brick information conforms to a value of a row height of the tile; and means for coding the video data.

Example 38. A device for coding video data, the device comprising: means for determining, for a tile in the video data, whether to signal one or more brick information for the tile based at least in part on a syntax element that specifies a value of a row height for the tile; and means for coding the video data based at least in part on the determination of whether to signal the one or more brick information for the tile.

Example 39. A device for coding video data, the device comprising: means for signaling one or more syntax elements indicative of one or more subpictures extracted from a picture in the video data; and means for coding the video data based at least in part on the one or more syntax elements.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding, in a picture parameter set (PPS), a syntax element indicative of a luma coding tree block size of coding tree units (CTUs) of a picture of the video data to which the PPS is applicable, wherein the syntax element has a same value as a corresponding syntax element indicative of the luma coding tree block size of CTUs of the picture of the video data in a sequence parameter set (SPS) that is applicable to the picture of the video data;
    determining the number of tiles in the picture of the video data based at least in part on the luma coding block tree size of the picture of the video data indicated by the syntax element; and
    decoding the picture of the video data to which the PPS is applicable in accordance with the syntax element in the PPS and the number of tiles in the picture.

2. The method of claim 1, wherein the syntax element indicative of the luma coding tree block size of the CTUs of the picture of the video data is indicative of the luma coding tree block size minus 5 of the CTUs of the picture of the video data.

3. The method of claim 2, wherein the syntax element comprises a syntax element pps_log_2_ctu_size_minus5.

4. The method of claim 3, wherein the syntax element pps_log_2_ctu_size_minus5 has a value that is the same as the corresponding syntax element pps_log_2_ctu_size_minus5 in the SPS that is applicable to the picture of the video data.

5. The method of claim 1, wherein decoding the syntax element further comprises:
    decoding the syntax element in the PPS using a conditional loop having a condition that is based at least in part on the number of tiles in the picture of the video data, including iterating the conditional loop based at least in part on the number of tiles in the picture of the video data.

6. The method of claim 1, wherein:
    the PPS does not include a second syntax element indicative of the number of tiles in the picture of the video data.

7. The method of claim 1, wherein decoding the syntax element further comprises:
    decoding the syntax element in the PPS using a conditional statement having a condition that is based at least in part on a height of an i-th tile row of the picture of the video data; and
    determining, based at least in part on the luma coding block tree size of the picture of the video data indicated by the syntax element, the height of the i-th tile row of the picture of the video data.

8. The method of claim 7, further comprising:
    inferring, based on the height of the i-th tile row of the picture of the video data, that an i-th tile of the picture of the video data is not divided into two or more bricks.

9. The method of claim 7, further comprising:
    inferring, based on the height of the i-th tile row of the picture of the video data, that one or more horizontal brick boundaries are uniformly distributed across an i-th tile of the picture of the video data is divided into two or more bricks.

10. The method of claim 1, wherein the syntax element comprises a first syntax element, the method further comprising:
    decoding, in the PPS, a second syntax element indicative of a number of subpictures in the picture of the video data; and
    decoding, in the PPS, a third syntax element indicative of a subpicture ID for each subpicture in the picture of the video data,
    wherein decoding the picture of the video data further comprises decoding the picture of the video data in accordance with the second syntax element in the PPS and the third syntax element in the PPS.

11. The method of claim 10, further comprising:
    decoding, in a slice header for a slice of the picture of the video data, a fourth syntax element indicative of the subpicture ID for the slice of the picture of the video data; and
    decoding the picture of the video data in accordance with the fourth syntax element in the slice header.

12. A device for decoding video data, the device comprising:
    memory configured to store video data; and
    one or more processors implemented in circuitry and communicatively coupled to the memory, the one or more processors being configured to:
        decode, in a picture parameter set (PPS), a syntax element indicative of a luma coding tree block size of coding tree units (CTUs) of a picture of the video data to which the PPS is applicable, wherein the syntax element has a same value as a corresponding syntax element indicative of the luma coding tree block size of CTUs of the picture of the video data in a sequence parameter set (SPS) that is applicable to the picture of the video data;

determine the number of tiles in the picture of the video data based at least in part on the luma coding block tree size of the picture of the video data indicated by the syntax element; and decode the picture of the video data to which the PPS is applicable in accordance with the syntax element in the PPS and the number of tiles in the picture.

13. The device of claim 12, wherein the syntax element indicative of the luma coding tree block size of the CTUs of the picture of the video data is indicative of the luma coding tree block size minus 5 of the CTUs of the picture of the video data.

14. The device of claim 13, wherein the syntax element comprises a syntax element pps_log_2_ctu_size_minus5.

15. The device of claim 14, wherein the syntax element pps_log_2_ctu_size_minus5 has a value that is the same as the corresponding syntax element pps_log_2_ctu_size_minus5 in the SPS that is applicable to the picture of the video data.

16. The device of claim 12 wherein the one or more processors are further configured to:

decode the syntax element in the PPS using a conditional loop having a condition that is based at least in part on the number of tiles in the picture of the video data, including iterating the conditional loop based at least in part on the number of tiles in the picture of the video data.

17. The device of claim 12, wherein:

the PPS does not include a second syntax element indicative of the number of tiles in the picture of the video data.

18. The device of claim 12, wherein the one or more processors are further configured to:

decode the syntax element in the PPS using a conditional statement having a condition that is based at least in part on a height of an i-th tile row of the picture of the video data; and determine, based at least in part on the luma coding block tree size of the picture of the video data indicated by the syntax element, the height of the i-th tile row of the picture of the video data.

19. The device of claim 18, wherein the one or more processors are further configured to:

infer, based on the height of the i-th tile row of the picture of the video data, that an i-th tile of the picture of the video data is not divided into two or more bricks.

20. The device of claim 18, wherein the one or more processors are further configured to:

infer, based on the height of the i-th tile row of the picture of the video data, that one or more horizontal brick boundaries are uniformly distributed across an i-th tile of the picture of the video data is divided into two or more bricks.

21. The device of claim 12, wherein the syntax element comprises a first syntax element, and wherein the one or more processors are further configured to:

decode, in the PPS, a second syntax element indicative of a number of subpictures in the picture of the video data;

decode, in the PPS, a third syntax element indicative of a subpicture ID for each subpicture in the picture of the video data; and decode the picture of the video data in accordance with the second syntax element in the PPS and the third syntax element in the PPS.

22. The device of claim 21, wherein the one or more processors are further configured to:

decode, in a slice header for a slice of the picture of the video data, a fourth syntax element indicative of the subpicture ID for the slice of the picture of the video data; and decode the picture of the video data in accordance with the fourth syntax element in the slice header.

23. The device of claim 12, further comprising a display configured to display the decoded picture.

24. The device of claim 12, wherein the device comprises a camera configured to capture the picture of the video data.

25. A device for video decoding, the device comprising:

means for decoding, in a picture parameter set (PPS), a syntax element indicative of a luma coding tree block size of coding tree units (CTUs) of a picture of video data to which the PPS is applicable, wherein the syntax element has a same value as a corresponding syntax element indicative of the luma coding tree block size of CTUs of the picture of the video data in a sequence parameter set (SPS) that is applicable to the picture of the video data;

means for determining the number of tiles in the picture of the video data based at least in part on the luma coding block tree size of the picture of the video data indicated by the syntax element; and means for decoding the picture of the video data to which the PPS is applicable in accordance with the syntax element in the PPS and the number of tiles in the picture of the video data.

26. A non-transitory computer-readable storage medium having stored thereon instructions that, when executed, cause one or more processors to:

decode, in a picture parameter set (PPS), a syntax element indicative of a luma coding tree block size of coding tree units (CTUs) of a picture of video data to which the PPS is applicable, wherein the syntax element has a same value as a corresponding syntax element indicative of the luma coding tree block size of CTUs of the picture of the video data in a sequence parameter set (SPS) that is applicable to the picture of the video data;

determine the number of tiles in the picture of the video data based at least in part on the luma coding block tree size of the picture of the video data indicated by the syntax element; and decode the picture of the video data to which the PPS is applicable in accordance with the syntax element in the PPS and the number of tiles in the picture of the video data.

* * * * *